United States Patent
Padaki et al.

(10) Patent No.: US 11,693,109 B2
(45) Date of Patent: Jul. 4, 2023

(54) FRAMEWORK AND METHOD FOR ACKNOWLEDGING MULTIPLE MESSAGES IN UWB COMMUNICATION AND RANGING SYSTEMS

(71) Applicant: Samsung Electronics Co., Ltd., Suwon-si (KR)

(72) Inventors: Aditya V. Padaki, Richardson, TX (US); Zheda Li, Plano, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 84 days.

(21) Appl. No.: 15/929,366

(22) Filed: Apr. 28, 2020

(65) Prior Publication Data

US 2020/0355819 A1  Nov. 12, 2020

Related U.S. Application Data

(60) Provisional application No. 62/916,438, filed on Oct. 17, 2019, provisional application No. 62/847,082, (Continued)

(51) Int. Cl.
*G01S 13/76* (2006.01)
*H04L 12/18* (2006.01)
(Continued)

(52) U.S. Cl.
CPC .......... *G01S 13/765* (2013.01); *G01S 13/762* (2013.01); *H04L 12/1868* (2013.01);
(Continued)

(58) Field of Classification Search
CPC .... G01S 13/765; G01S 13/762; H04W 64/00; H04W 48/16; H04W 8/00; H04W 4/023;
(Continued)

(56) References Cited

U.S. PATENT DOCUMENTS 9,344,485 B2    5/2016  Smadi et al.
2008/0159427 A1*  7/2008  Kang ............... H04J 3/0682
                                                      455/69
(Continued)

FOREIGN PATENT DOCUMENTS

KR    10-2013-0034827 A    4/2013

OTHER PUBLICATIONS

Lee et al. "IEEE 802.15.4z MAC", IEEE P802.15 Working Group for Wireless Personal Area Networks (WPANs), Dec. 2018, 51 pages. (Year: 2018).*

(Continued)

*Primary Examiner* — Huy D Vu
*Assistant Examiner* — Robert Ma

(57) ABSTRACT

A method and apparatus a first network entity in a wireless communication system supporting ranging capability is provided. The method and apparatus comprises: identifying, in a ranging block, one or more ranging rounds to transmit a ranging control message (RCM) with a multiple message receipt confirmation request (MMRCR) for a transmission of at least one first message comprising at least one of a set of ranging messages or a set of ranging ancillary data messages; transmitting, to a second network entity, the RCM with the MMRCR; transmitting, to the second network entity, ranging ancillary data in at least one ranging round of one or more ranging rounds following the RCM, wherein the ranging ancillary data is associated with the MMRCR; and receiving, from the second network entity, a ranging multiple message receipt confirmation (RMMRC) corresponding to the transmission of the at least one first message.

18 Claims, 18 Drawing Sheets

Related U.S. Application Data filed on May 13, 2019, provisional application No. 62/846,355, filed on May 10, 2019.

(51) Int. Cl.

| | |
|---|---|
| *H04W 64/00* | (2009.01) |
| *H04W 48/16* | (2009.01) |
| *H04W 8/00* | (2009.01) |
| *H04L 43/0864* | (2022.01) |
| *H04W 4/02* | (2018.01) |
| *H04W 40/24* | (2009.01) |
| *H04J 3/06* | (2006.01) |
| *H04W 4/14* | (2009.01) |

(52) U.S. Cl.
CPC ......... *H04L 43/0864* (2013.01); *H04W 4/023* (2013.01); *H04W 8/00* (2013.01); *H04W 40/246* (2013.01); *H04W 48/16* (2013.01); *H04W 64/00* (2013.01); *H04J 3/0682* (2013.01); *H04W 4/14* (2013.01)

(58) Field of Classification Search
CPC .. H04W 40/246; H04W 4/14; H04L 43/0864; H04L 12/1868; H04J 3/0682
See application file for complete search history.

(56) References Cited

U.S. PATENT DOCUMENTS

| | | | | |
|---|---|---|---|---|
| 2011/0034195 | A1* | 2/2011 | Lee | H04W 56/0005 455/509 |
| 2013/0005342 | A1* | 1/2013 | Cho | H04W 4/14 455/438 |
| 2013/0083774 | A1 | 4/2013 | Son et al. | |
| 2015/0016359 | A1 | 1/2015 | Wang et al. | |
| 2015/0085686 | A1 | 3/2015 | Chande et al. | |
| 2015/0092697 | A1 | 4/2015 | Yeow et al. | |
| 2016/0080960 | A1 | 3/2016 | Aldana et al. | |
| 2016/0149671 | A1 | 5/2016 | Yang et al. | |
| 2016/0234756 | A1* | 8/2016 | Alanen | H04W 74/008 |
| 2016/0366578 | A1 | 12/2016 | Abraham et al. | |
| 2016/0374100 | A1* | 12/2016 | Das | H04L 47/2491 |
| 2020/0137676 | A1* | 4/2020 | Yoon | H04W 64/006 |
| 2020/0150261 | A1* | 5/2020 | Naguib | H04L 12/189 |

OTHER PUBLICATIONS

International Search Report and Written Opinion of the International Searching Authority in connection with International Patent Application No. PCT/KR2020/005952 dated Jul. 30, 2020, 8 pages.

"IEEE Standard for Wireless Medium Access Control (MAC) and Physical Layer (PHY) Specifications for Peer Aware Communications (PAC)", IEEE Computer Society, IEEE Std 802.15.8TM, Dec. 2017, 322 pages.

"IEEE Standard for Information technology—Telecommunications and information exchange between systems—Local and metropolitan area networks—Specific requirements; Part 15.4: Wireless Medium Access Control (MAC) and Physical Layer (PHY) Specifications for Low-Rate Wireless Personal Area Networks (WPANs); Amendment 1: Add Alternate PHYs", IEEE Std 802.15.4a™-2007, Aug. 2007, 203 pages.

"IEEE 802.15.4z MAC", IEEE P802.15 Working Group for Wireless Personal Area Networks (WPANs), Dec. 2018, 51 pages.

Extended European Search Report dated May 11, 2022 regarding Application No. 20805418.9, 9 pages.

\* cited by examiner

Ranging Round

| Bits: 2 | 4 | 1 | 1 | 1 | 6 | 6 | Octets: 2 | 2 | 1 |
|---|---|---|---|---|---|---|---|---|---|
| Cast Mode | Ranging Mode | Schedule Mode | Deferred Mode | Time Structure Indicator | Block Length Multiplier | Number of Active Ranging Rounds | Minimum Block Length | Ranging Round Length | Ranging Slot Length |

FIG. 9

| Bits: 2 | 2 | 2 | 1 | 1 | 1 | 6 | 6 | 3 | Octets: 2 | 2 | 1 |
|---|---|---|---|---|---|---|---|---|---|---|---|
| Multi-node Mode | Ranging Method | STS Packet Config | Schedule Mode | Deferred Mode | Time Structure Indicator | Block Length Multiplier | Number of Active Ranging Rounds | Reserved | Minimum Block Duration | Ranging Round Length | Ranging Slot Length |

FIG. 10

*One-to-One Unicast Messages*

| Bits: 2 | 2 | 2 | 1 | 1 | 1 | 6 | 1 | 2 | Octets: 2 | 2 | 1 |
|---|---|---|---|---|---|---|---|---|---|---|---|
| Multi-node Mode | Ranging Method | STS Packet Config. | Schedule Mode | Deferred Mode | Time Structure Indicator | Number of Active Ranging Rounds | Multiple Message Acknowledgement Request | Reserved | Minimum Block Duration | Ranging Round length | Ranging Slot Length |

FIG. 16A

| Bits: 2 | 2 | 2 | 1 | 1 | 1 | 6 | 1 | 1 | 1 | Octets: 2 | 2 | 1 |
|---|---|---|---|---|---|---|---|---|---|---|---|---|
| Multi-node Mode | Ranging Method | STS Packet Config | Schedule Mode | Deferred Mode | Time Structure Indicator | Number of Active Ranging Rounds | Ranging Ancillary Data (in payload) | Multiple Message Acknowledgement Request | Reserved | Minimum Block Duration | Ranging Round length | Ranging Slot Length |

FIG. 16B

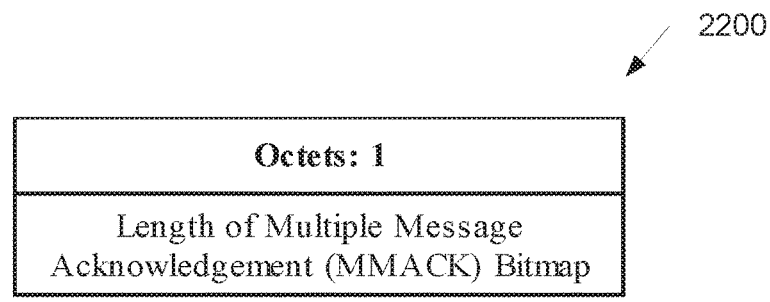

```
                              ┌─────────────────────────────────────┐
                              │             Octets: 1               │
                              ├─────────────────────────────────────┤
                              │     Length of Multiple Message      │
                              │  Acknowledgement (MMACK) Bitmap     │
                              └─────────────────────────────────────┘
```

FIG. 22

```
┌───────────────────────────────────┬───────────────────────────────────────────┐
│            Octets: 1              │                 variable                  │
├───────────────────────────────────┼───────────────────────────────────────────┤
│     Length of Multiple Message    │                                           │
│  Acknowledgement (MMACK) Bitmap   │   Multiple Message Acknowledgement Bitmap │
└───────────────────────────────────┴───────────────────────────────────────────┘
```

FIG. 23

```
┌───────────────────────┬───────────────────────┐
│       Octets: 1       │       Variable        │
├───────────────────────┼───────────────────────┤
│   MMACK table length  │      MMACK Table      │
└───────────────────────┴───────────────────────┘
```

FIG. 24

FRAMEWORK AND METHOD FOR ACKNOWLEDGING MULTIPLE MESSAGES IN UWB COMMUNICATION AND RANGING SYSTEMS

CROSS-REFERENCE TO RELATED APPLICATIONS AND CLAIM OF PRIORITY

The present application claims priority to:
U.S. Provisional Patent Application No. 62/846,335 filed on May 10, 2019;
U.S. Provisional Patent Application No. 62/847,082 filed on May 13, 2019; and
U.S. Provisional Patent Application No. 62/916,438 filed on Oct. 17, 2019.
The content of the above-identified patent documents is incorporated herein by reference.

TECHNICAL FIELD

The present disclosure relates generally to frameworks and methods for acknowledging multiple messages in UWB communication and ranging systems.

BACKGROUND

A peer aware communication (PAC) network is a fully distributed communication network that allows direct communication among the PAC devices (PDs). A PAC device is an electronic device that has communication capability. Additionally, The PAC device can also have ranging capability. The PAC device may be referred to as a ranging device (RDEV), or an enhanced ranging device (ERDEV), or a secure ranging device (SRDEV) or any other similar name. RDEV, ERDEV, or SRDEV can be a part of an access point (AP), a station (STA), an eNB, a gNB, a UE, or any other communication node with ranging capability as defined in IEEE standard specification. PAC networks may employ several topologies like mesh, star, etc. to support interactions among the PDs for various services.

SUMMARY

Embodiments of the present disclosure provide frameworks and methods for acknowledging multiple messages in UWB communication and ranging systems.

In one embodiment, a first network entity in a wireless communication system supporting ranging capability is provided. The first network entity comprises a processor configured to identify, in a ranging block, one or more ranging rounds to transmit a ranging control message (RCM) with a multiple message receipt confirmation request (MMRCR) for a transmission of at least one first message comprising at least one of a set of ranging messages or a set of ranging ancillary data messages. The first network entity further comprises a transceiver operably connected to the processor, the transceiver configured to: transmit, to a second network entity, the RCM with the MMRCR; transmit, to the second network entity, ranging ancillary data in at least one ranging round of one or more ranging rounds following the RCM, wherein the ranging ancillary data is associated with the MMRCR; and receive, from the second network entity, a ranging multiple message receipt confirmation (RMMRC) corresponding to the transmission of the at least one first message.

In another embodiment, a second network entity in a wireless communication system supporting ranging capability is provided. The second network entity comprises a processor configured to identify, in a ranging block, one or more ranging rounds to receive a ranging control message (RCM) with a multiple message receipt confirmation request (MMRCR) for a reception of at least one first message comprising at least one of a set of ranging messages or a set of ranging ancillary data messages. The second network further comprises a transceiver configured to: receive, from a first network entity, the RCM with the MMRCR; and receive, from the first network entity, ranging ancillary data in at least one ranging round of the one or more ranging rounds following the RCM, wherein the ranging ancillary data is associated with the MMRCR; and transmit, to the first network entity, a ranging multiple message receipt confirmation (RMMRC) corresponding to the reception of the at least one first message.

In yet another embodiment, a method of a first network entity in a wireless communication system supporting ranging capability is provided. The method comprises: identifying, in a ranging block, one or more ranging rounds to transmit a ranging control message (RCM) with a multiple message receipt confirmation request (MMRCR) for a transmission of at least one first message comprising at least one of a set of ranging messages or a set of ranging ancillary data messages; transmitting, to a second network entity, the RCM with the MMRCR; transmitting, to the second network entity, ranging ancillary data in at least one ranging round of one or more ranging rounds following the RCM, wherein the ranging ancillary data is associated with the MMRCR; and receiving, from the second network entity, a ranging multiple message receipt confirmation (RMMRC) corresponding to the transmission of the at least one first message.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The term "ranging," as well as derivatives thereof, mean that the fundamental measurements for ranging between devices are achieved by a transmission and a reception of one or more messages. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9 illustrates an example advanced ranging control IE as defined in 802.15.4z according to embodiments of the present disclosure;

FIG. 10 illustrates an example advanced ranging control IE Content field format as defined in 802.15.4z according to embodiments of the present disclosure;

FIG. 16A illustrates an example multiple message acknowledgement request bit in ARC IE to indicate MMAR according to embodiments of the present disclosure;

FIG. 16B illustrates another example multiple message acknowledgement Request bit in ARC IE to indicate MMAR according to embodiments of the present disclosure;

FIG. 22 illustrates an example content field of the IE to convey the length of MMACK bitmap according to embodiments of the present disclosure;

FIG. 23 illustrates an example content field for an IE for Multiple Message Acknowledgement according to embodiments of the present disclosure;

FIG. 24 illustrates an example content field of IE for MMACK with addresses in acknowledgement according to embodiments of the present disclosure;

DETAILED DESCRIPTION

FIG. 1 through FIG. 28, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: (i) IEEE Standard for Wireless Medium Access Control (MAC) and Physical Layer (PHY) Specifications for Peer Aware Communications, IEEE Std 802.15.8, 2017 and (ii) IEEE Standard Wireless Medium Access Control (MAC) and Physical Layer (PHY) Specifications for Low Rate Wireless Personal Area Networks (WPANs), Amendment 1: Add Alternative PHYs, IEEE Std 802.15.4a (2007).

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

Figure 1:
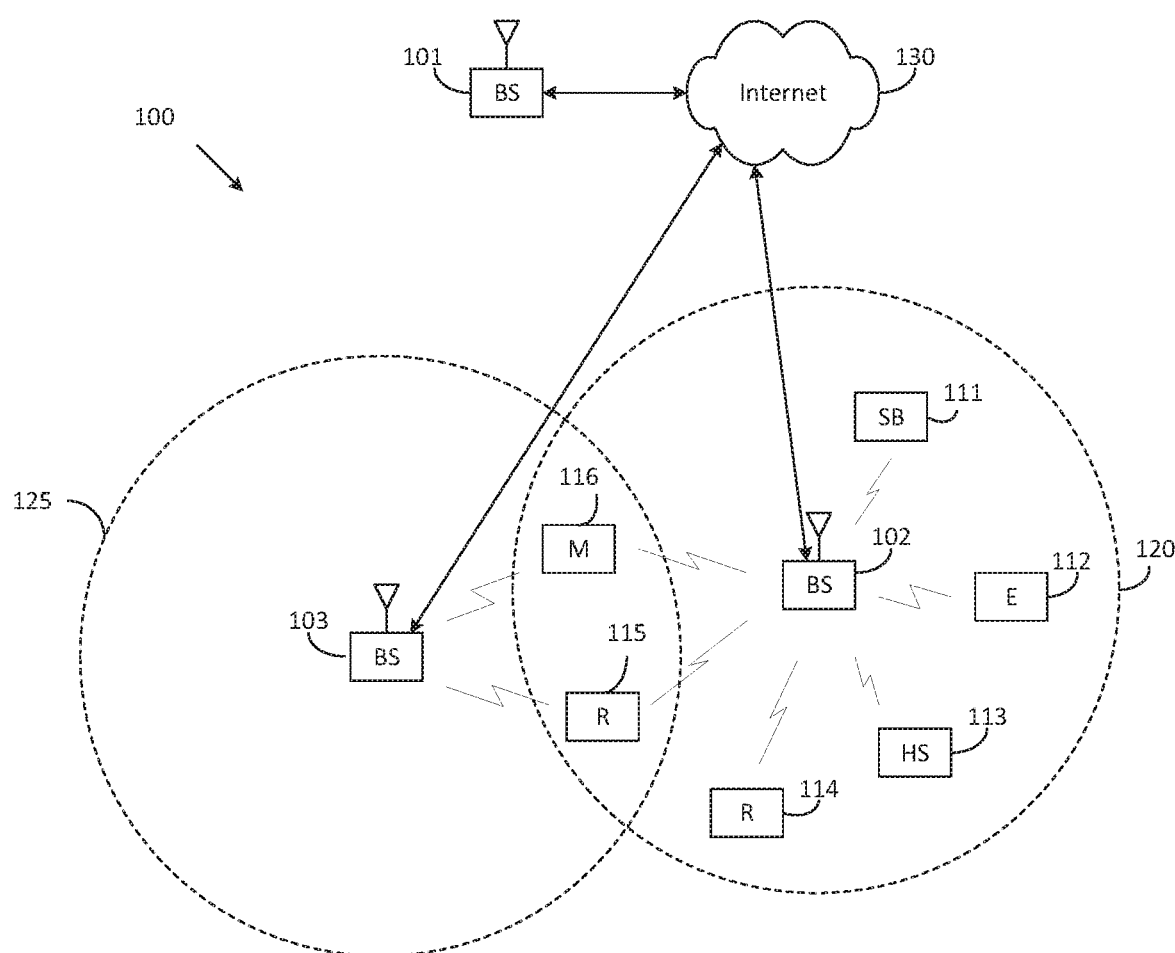
FIG. 1 illustrates an example wireless network according to embodiments of the present disclosure.
Figure 2:
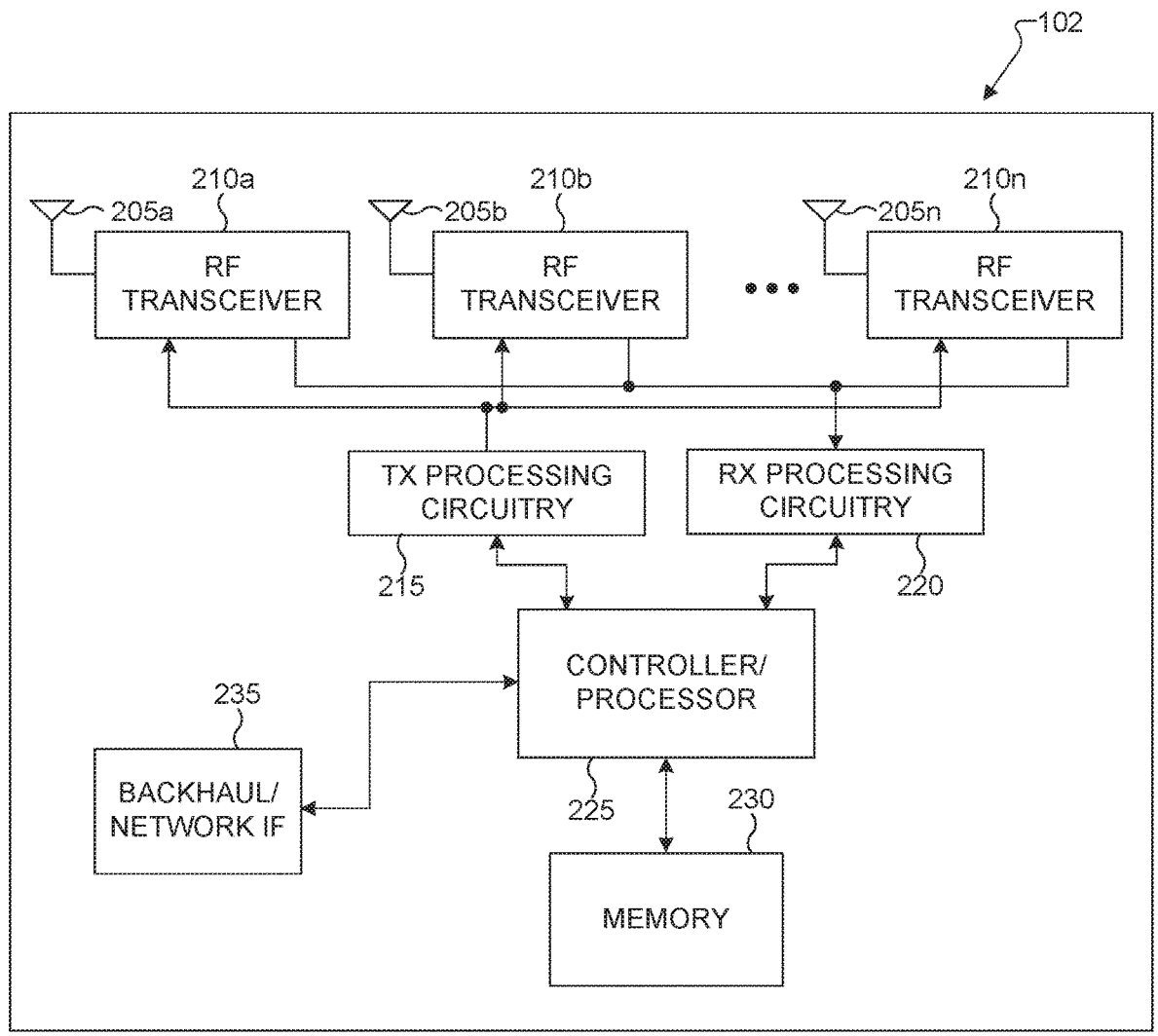
FIG. 2 illustrates an example gNB according to embodiments of the present disclosure.
Figure 3:
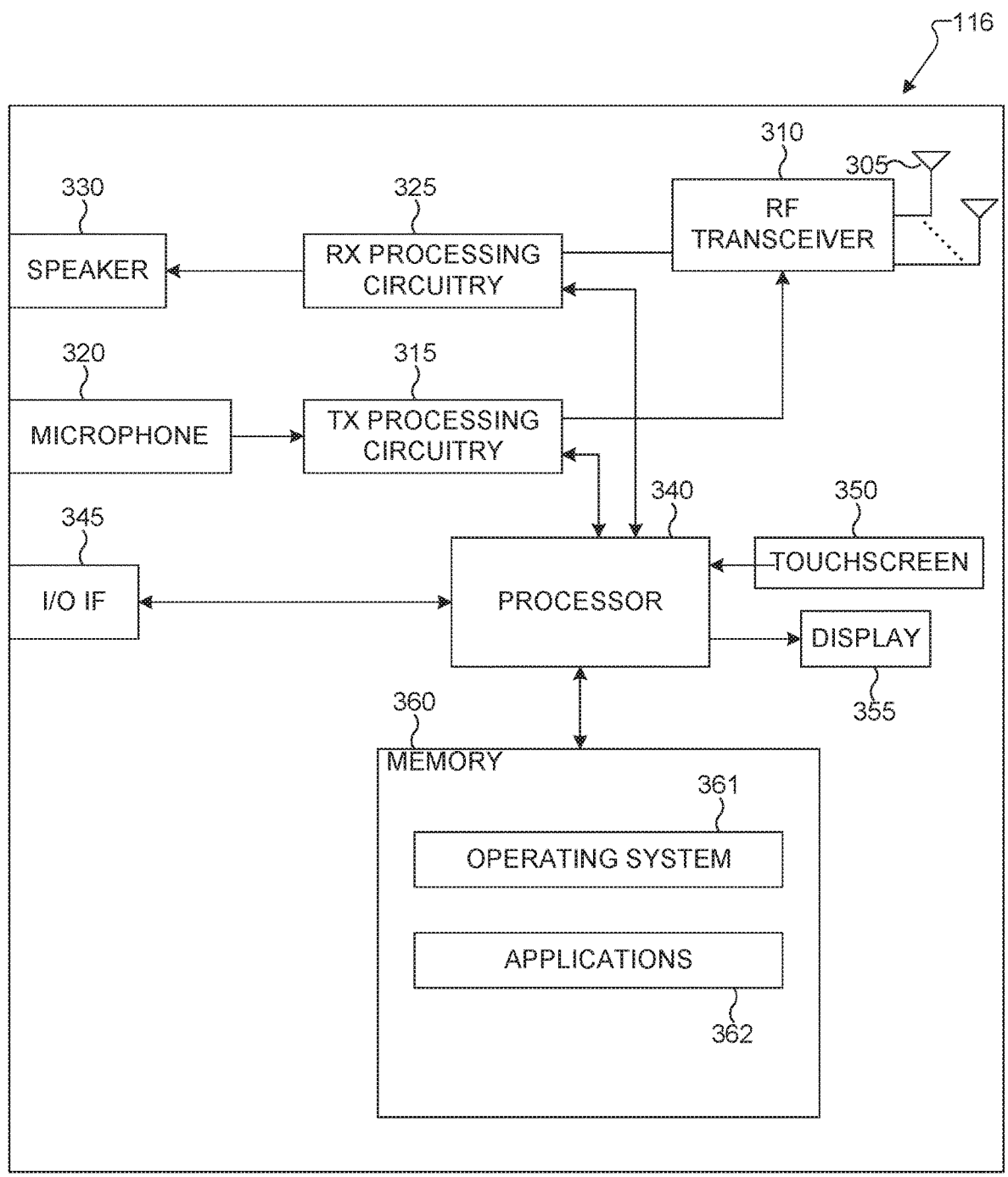
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101 (e.g., base station (BS)), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a Wi-Fi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, Wi-Fi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a Wi-Fi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for acknowledging multiple messages in UWB communication and ranging systems. Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
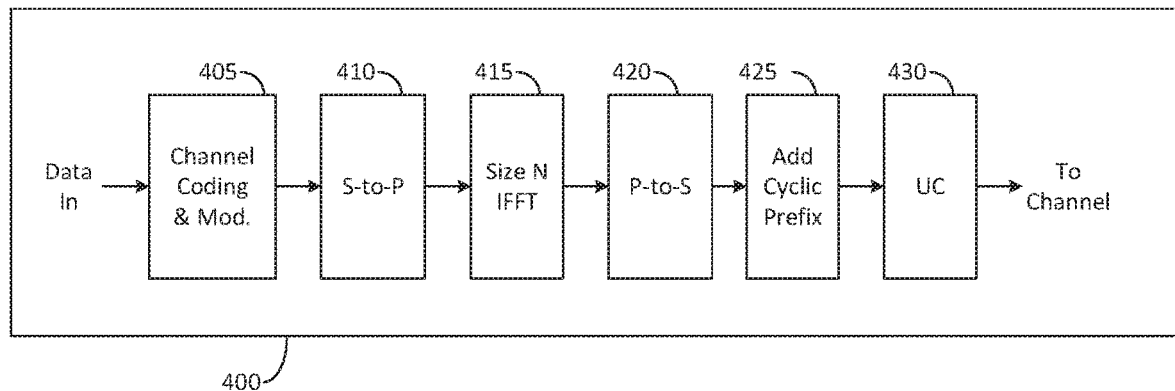
FIG. 4A illustrates a high-level diagram of an orthogonal frequency division multiple access transmit path according to embodiments of the present disclosure.
Figure 4B:
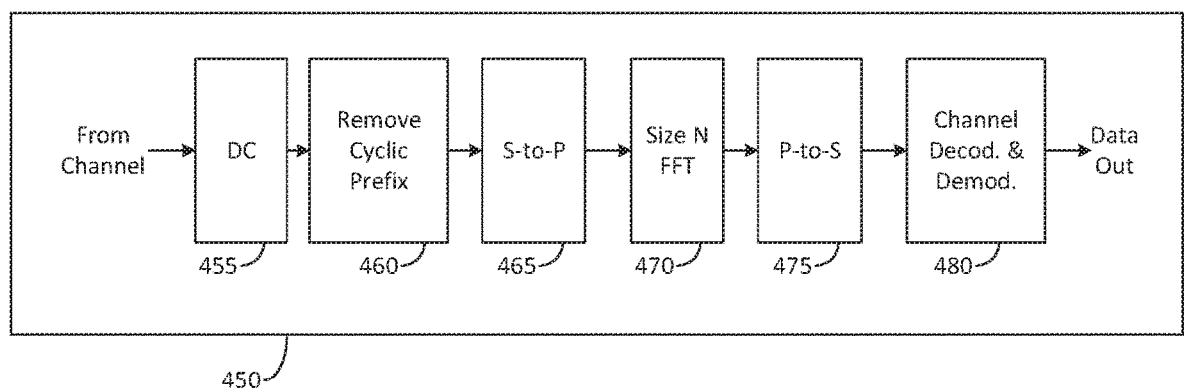
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and may not be construed to limit the scope of the present disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at the gNB 102 are performed. Down-converter 455 down-converts the received signal to baseband frequency and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

A peer aware communication (PAC) network is a fully distributed communication network that allows direct communication among the PAC devices (PDs). A wireless personal area network (WPAN) or simply a personal area network (PAN) may be a fully distributed communication network. A WPAN or PAN is communication network that allows wireless connectivity among the PAN devices (PDs). PAN devices and PAC devices may be interchangeably used as PAC network is also a PAN network and vice versa.

PAC networks may employ several topologies like mesh, star, and/or peer-to-peer, etc. to support interactions among the PDs for various services. While the present disclosure uses PAC networks and PDs as an example to develop and illustrate the present disclosure, it is to be noted that the present disclosure is not confined to these networks. The general concepts developed in the present disclosure may be employed in various type of networks with different kind of scenarios.

Figure 5:
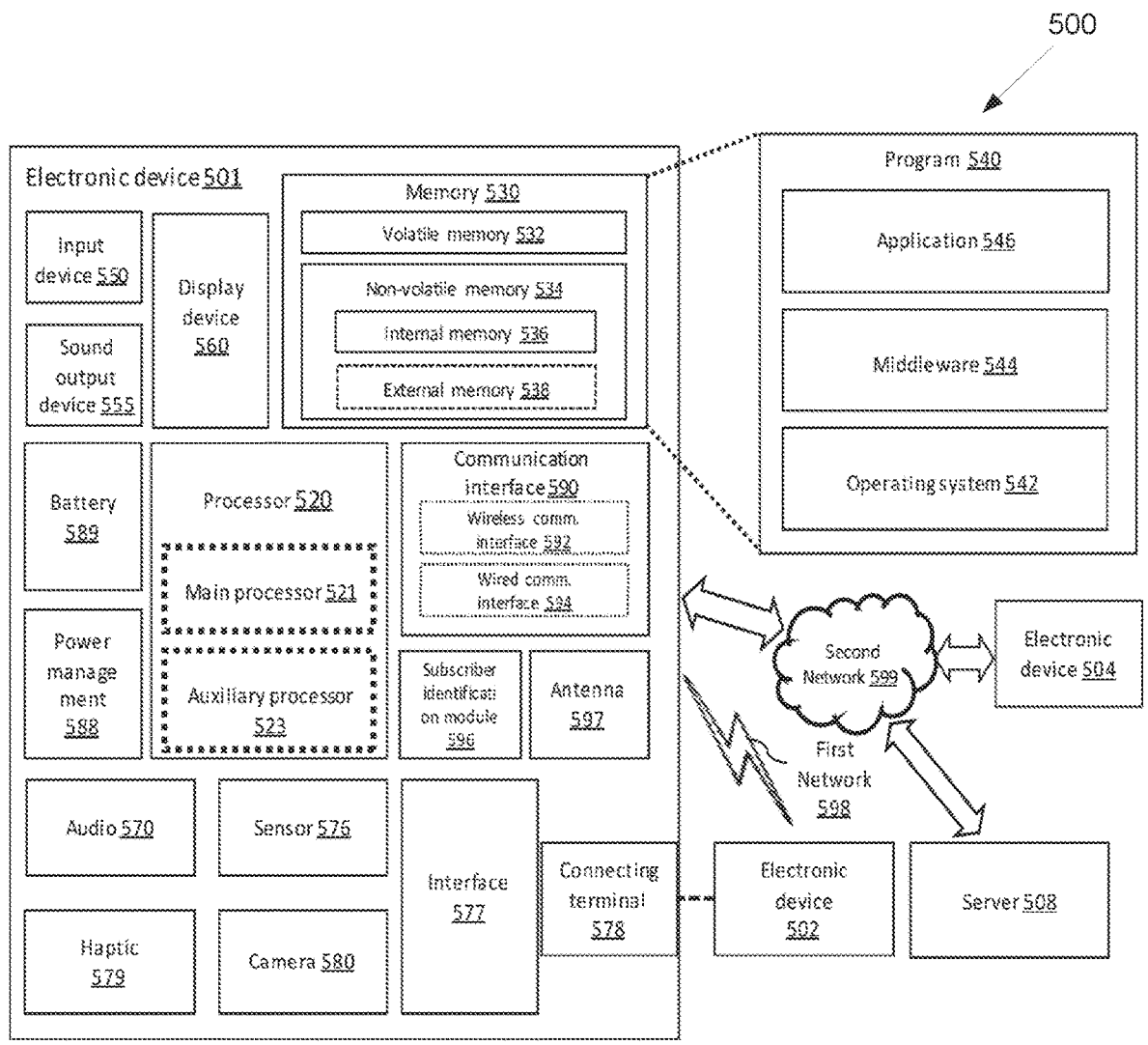
FIG. 5 illustrates an example electronic device according to embodiments of the present disclosure.

FIG. 5 illustrates an example electronic device 501 according to embodiments of the present disclosure. The embodiment of the electronic device 501 illustrated in FIG.

5 is for illustration only. FIG. 5 does not limit the scope of the present disclosure to any particular implementation.

PDs can be an electronic device that may have communication and ranging capability. The electronics device may be referred to as a ranging device (RDEV), or an enhanced ranging device (ERDEV), or a secure ranging device (SRDEV) or any other similar name in accordance with the IEEE standard specification. RDEV, ERDEV, or SRDEV can be a part of an access point (AP), a station (STA), an eNB, a gNB, a UE, or any other communication node with ranging capability.

Referring to FIG. 5, the electronic device 501 in the network environment 500 may communicate with an electronic device 502 via a first network 598 (e.g., a short-range wireless communication network), or an electronic device 104 or a server 508 via a second network 599 (e.g., a long-range wireless communication network). According to an embodiment, the electronic device 501 may communicate with the electronic device 504 via the server 508.

According to an embodiment, the electronic device 501 may include a processor 520, memory 530, an input device 550, a sound output device 555, a display device 560, an audio 570, a sensor 576, an interface 577, a haptic 579, a camera 580, a power management 588, a battery 589, a communication interface 590, a subscriber identification module (SIM) 596, or an antenna 597. In some embodiments, at least one (e.g., the display device 560 or the camera 580) of the components may be omitted from the electronic device 501, or one or more other components may be added in the electronic device 501. In some embodiments, some of the components may be implemented as single integrated circuitry. For example, the sensor 576 (e.g., a fingerprint sensor, an iris sensor, or an illuminance sensor) may be implemented as embedded in the display device 560 (e.g., a display).

The processor 520 may execute, for example, software (e.g., a program 540) to control at least one other component (e.g., a hardware or software component) of the electronic device 501 coupled with the processor 520 and may perform various data processing or computation. According to one embodiment of the present disclosure, as at least part of the data processing or computation, the processor 520 may load a command or data received from another component (e.g., the sensor 576 or the communication interface 590) in volatile memory 532, process the command or the data stored in the volatile memory 532, and store resulting data in non-volatile memory 534.

According to an embodiment of the present disclosure, the processor 520 may include a main processor 521 (e.g., a central processing unit (CPU) or an application processor (AP)), and an auxiliary processor 523 (e.g., a graphics processing unit (GPU), an image signal processor (ISP), a sensor hub processor, or a communication processor (CP)) that is operable independently from, or in conjunction with, the main processor 521. Additionally or alternatively, the auxiliary processor 523 may be adapted to consume less power than the main processor 521, or to be specific to a specified function. The auxiliary processor 523 may be implemented as separate from, or as part of the main processor 521.

The auxiliary processor 523 may control at least some of functions or states related to at least one component (e.g., the display device 560, the sensor 576, or the communication interface 590) among the components of the electronic device 501, instead of the main processor 521 while the main processor 521 is in an inactive (e.g., sleep) state, or together with the main processor 521 while the main processor 521 is in an active state (e.g., executing an application). According to an embodiment, the auxiliary processor 523 (e.g., an image signal processor or a communication processor) may be implemented as part of another component (e.g., the camera 580 or the communication interface 190) functionally related to the auxiliary processor 523.

The memory 530 may store various data used by at least one component (e.g., the processor 520 or the sensor 576) of the electronic device 501. The various data may include, for example, software (e.g., the program 540) and input data or output data for a command related thereto. The memory 530 may include the volatile memory 532 or the non-volatile memory 534.

The program 50 may be stored in the memory 530 as software, and may include, for example, an operating system (OS) 542, middleware 544, or an application 546.

The input device 550 may receive a command or data to be used by other components (e.g., the processor 520) of the electronic device 101, from the outside (e.g., a user) of the electronic device 501. The input device 550 may include, for example, a microphone, a mouse, a keyboard, or a digital pen (e.g., a stylus pen).

The sound output device 555 may output sound signals to the outside of the electronic device 501. The sound output device 555 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 560 may visually provide information to the outside (e.g., a user) of the electronic device 501. The display device 560 may include, for example, a display, a hologram device, or a projector and control circuitry to control a corresponding one of the displays, hologram device, and projector. According to an embodiment, the display device 560 may include touch circuitry adapted to detect a touch, or sensor circuitry (e.g., a pressure sensor) adapted to measure the intensity of force incurred by the touch.

The audio 570 may convert a sound into an electrical signal and vice versa. According to an embodiment, the audio 570 may obtain the sound via the input device 550, or output the sound via the sound output device 555 or a headphone of an external electronic device (e.g., an electronic device 502) directly (e.g., using wired line) or wirelessly coupled with the electronic device 501.

The sensor 576 may detect an operational state (e.g., power or temperature) of the electronic device #01 or an environmental state (e.g., a state of a user) external to the electronic device 501, and then generate an electrical signal or data value corresponding to the detected state. According to an embodiment, the sensor 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device (e.g., the electronic device 502) directly (e.g., using wired line) or wirelessly. According to an embodiment of the present disclosure, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device (e.g., the electronic device 502). According to an embodiment, the connecting terminal 578 may include, for example, a HDMI connector, a USB connector, a SD card connector, or an audio connector (e.g., a headphone connector).

The haptic 579 may convert an electrical signal into a mechanical stimulus (e.g., a vibration or a movement) or electrical stimulus which may be recognized by a user via his tactile sensation or kinesthetic sensation. According to an embodiment, the haptic 579 may include, for example, a motor, a piezoelectric element, or an electric stimulator.

The camera 580 may capture a still image or moving images. According to an embodiment of the present disclosure, the camera 580 may include one or more lenses, image sensors, image signal processors, or flashes.

The power management 588 may manage power supplied to the electronic device 501. According to one embodiment, the power management 588 may be implemented as at least part of, for example, a power management integrated circuit (PMIC). The battery 589 may supply power to at least one component of the electronic device 501. According to an embodiment, the battery 589 may include, for example, a primary cell which is not rechargeable, a secondary cell which is rechargeable, or a fuel cell.

The communication interface 590 may support establishing a direct (e.g., wired) communication channel or a wireless communication channel between the electronic device 101 and the external electronic device (e.g., the electronic device 502, the electronic device 504, or the server 508) and performing communication via the established communication channel. The communication interface 590 may include one or more communication processors that are operable independently from the processor 520 (e.g., the application processor (AP)) and supports a direct (e.g., wired) communication or a wireless communication. According to an embodiment of the present disclosure, the communication interface 590 may include a wireless communication interface 592 (e.g., a cellular communication interface, a short-range wireless communication interface, or a global navigation satellite system (GNSS) communication interface) or a wired communication interface 594 (e.g., a local area network (LAN) communication interface or a power line communication (PLC)). A corresponding one of these communication interfaces may communicate with the external electronic device via the first network 598 (e.g., a short-range communication network, such as Bluetooth, wireless-fidelity (Wi-Fi) direct, ultra-wide band (UWB), or infrared data association (IrDA)) or the second network 599 (e.g., a long-range communication network, such as a cellular network, the Internet, or a computer network (e.g., LAN or wide area network (WAN))). These various types of communication interfaces may be implemented as a single component (e.g., a single chip), or may be implemented as multi components (e.g., multi chips) separate from each other. The wireless communication interface 592 may identify and authenticate the electronic device 501 in a communication network, such as the first network 598 or the second network 599, using subscriber information (e.g., international mobile subscriber identity (IMSI)) stored in the subscriber identification module 596.

The antenna 597 may transmit or receive a signal or power to or from the outside (e.g., the external electronic device) of the electronic device 501. According to an embodiment, the antenna 597 may include an antenna including a radiating element composed of a conductive material or a conductive pattern formed in or on a substrate (e.g., PCB). According to an embodiment, the antenna 597 may include a plurality of antennas. In such a case, at least one antenna appropriate for a communication scheme used in the communication network, such as the first network 198 or the second network 599, may be selected, for example, by the communication interface 590 (e.g., the wireless communication interface 592) from the plurality of antennas. The signal or the power may then be transmitted or received between the communication interface 590 and the external electronic device via the selected at least one antenna. According to an embodiment, another component (e.g., a radio frequency integrated circuit (RFIC)) other than the radiating element may be additionally formed as part of the antenna 597.

At least some of the above-described components may be coupled mutually and communicate signals (e.g., commands or data) there between via an inter-peripheral communication scheme (e.g., a bus, general purpose input and output (GPIO), serial peripheral interface (SPI), or mobile industry processor interface (MIPI)).

According to an embodiment of the present disclosure, commands or data may be transmitted or received between the electronic device 501 and the external electronic device 504 via the server 508 coupled with the second network 599. Each of the electronic devices 502 and 504 may be a device of a same type as, or a different type, from the electronic device 501. According to an embodiment, all or some of operations to be executed at the electronic device 501 may be executed at one or more of the external electronic devices 502, 504, or 508. For example, if the electronic device 501 may perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the present disclosure, the electronic devices are not limited to those described above.

Various embodiments as set forth herein may be implemented as software (e.g., the program 140) including one or more instructions that are stored in a storage medium (e.g., internal memory 536 or external memory 538) that is readable by a machine (e.g., the electronic device 501). For example, a processor (e.g., the processor 520) of the machine (e.g., the electronic device 501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the present disclosure, a method according to various embodiments of the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the present disclosure, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as one or more functions are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

A ranging block is a time period for ranging. Each ranging block includes an integer multiple of ranging rounds, where a ranging round is the time period to complete of one entire range-measuring cycle involving the set of RDEV participating in the ranging measuring. Each ranging round is further subdivided into an integer number of ranging slots, where a ranging slot is a period of time of sufficient length for the transmission of at least one REFRAME.

Figure 6:
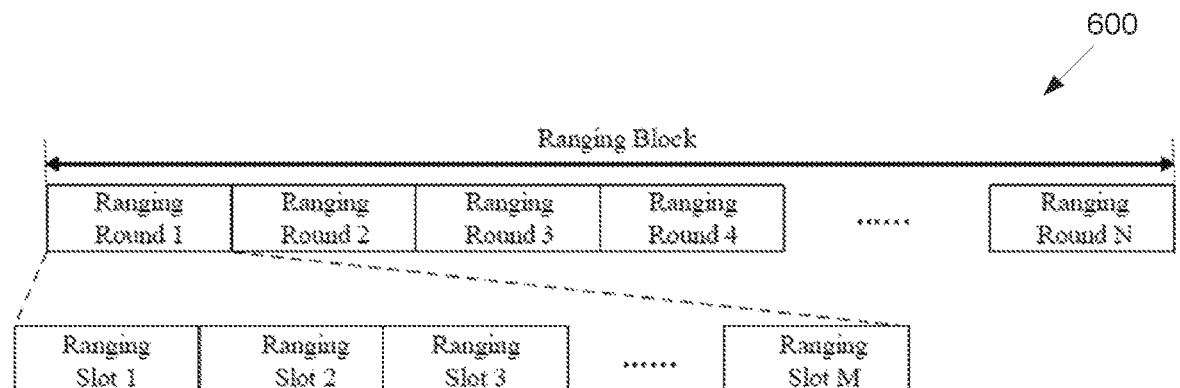
FIG. 6 illustrates an example ranging configuration according to embodiments of the present disclosure.
Figure 8:
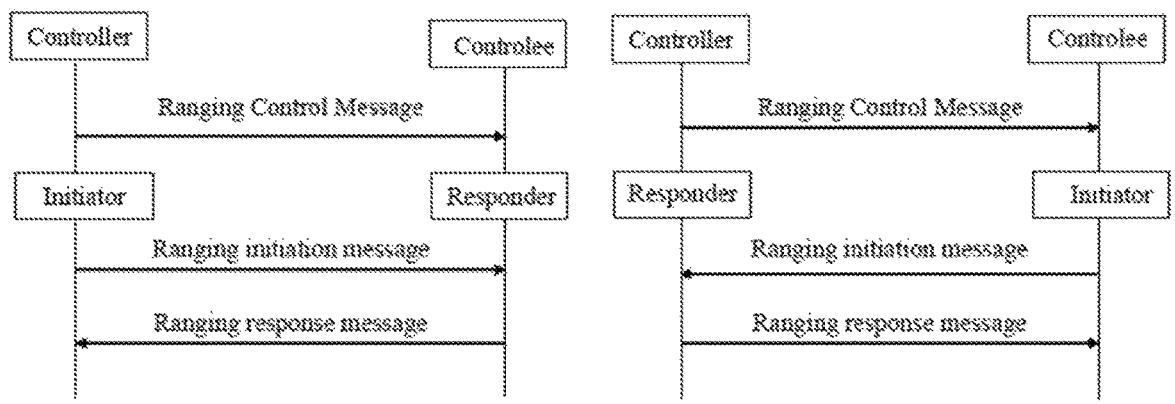
FIG. 8 illustrates an example ranging controller, controlee, initiator, responder according to embodiments of the present disclosure.

FIG. 6 illustrates an example ranging configuration 600 according to embodiments of the present disclosure. The embodiment of the ranging configuration 600 illustrated in FIG. 6 is for illustration only. FIG. 6 does not limit the scope of the present disclosure to any particular implementation. In one embodiment, the ranging configuration 600 may be used by a controller, a controlee, an initiator, and/or responder as illustrated in FIG. 8. In one embodiment, the ranging configuration 600 may be used by a network entity (e.g., BS 101-103 as illustrated in FIG. 1, terminal 111-116 as illustrated in FIG. 1).

FIG. 6 shows the ranging block Structure, with the ranging block divided into N ranging rounds, each consisting of M ranging slots.

The general ranging round structure includes a ranging control period in which a ranging control message is transmitted to configure the ranging rounds. It is followed by one or more ranging periods and data periods. These data periods usually include transmission of ranging related data using certain information elements (IE) defined within the standard. The most generic ranging round structure is as shown in FIG. 7.

Figure 7:
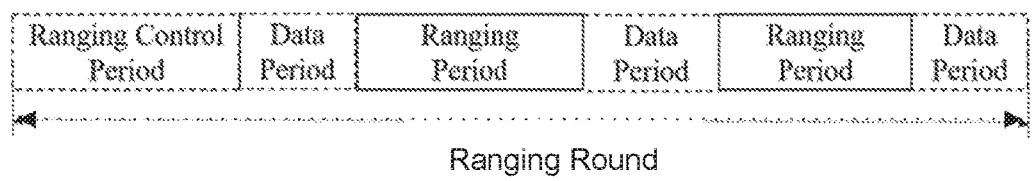
FIG. 7 illustrates an example general ranging round structure according to embodiments of the present disclosure.

FIG. 7 illustrates an example general ranging round structure 700 according to embodiments of the present disclosure. The embodiment of the general ranging round structure 700 illustrated in FIG. 7 is for illustration only. FIG. 7 does not limit the scope of the present disclosure to any particular implementation. In one embodiment, the general ranging round structure 700 may be used by a controller, a controlee, an initiator, and/or responder as illustrated in FIG. 8. In one embodiment, the general ranging round structure 700 may be used by a network entity (e.g., BS 101-103 as illustrated in FIG. 1, terminal 111-116 as illustrated in FIG. 1).

In the present disclosure, following nomenclature is used: controller: a ranging device that defines and controls the ranging parameters by sending ranging control message in ranging control period; controlee: a Ranging device that utilizes the ranging parameters received from the controller; initiator: a ranging device that initiates a ranging exchange by sending the first message of the exchange or the device that send ranging ancillary data (in payload)/data; and responder: a ranging device that receives ranging ancillary data (in payload)/data and/or responds to the message received from the initiator.

FIG. 8 illustrates an example ranging controller, controlee, initiator, and responder 800 according to embodiments of the present disclosure. The embodiment of the ranging controller, controlee, initiator, and responder 800 illustrated in FIG. 8 is for illustration only. FIG. 8 does not limit the scope of the present disclosure to any particular implementation.

A relevant IE for this is the advanced ranging control IE as shown in that is usually transmitted during the ranging control period. The advanced ranging control IE (ARC IE) is used by a controller to send the ranging configuration 22 information to a controlee (in a unicast frame) or multiple controlees (in multicast/broadcast frame). The content field of the ARC IE maybe formatted as shown in FIG. 9.

FIG. 9 illustrates an example advanced ranging control IE as defined in 802.15.4z 900 according to embodiments of the present disclosure. The embodiment of the advanced ranging control IE as defined in 802.15.4z 900 illustrated in FIG. 9 is for illustration only. FIG. 9 does not limit the scope of the present disclosure to any particular implementation. In one embodiment, the advanced ranging control IE as defined in 802.15.4z 900 may be used by a controller, a controlee, an initiator, and/or responder as illustrated in FIG. 8. In one embodiment, the advanced ranging control IE as defined in 802.15.4z 900 may be used by a network entity (e.g., BS 101-103 as illustrated in FIG. 1, terminal 111-116 as illustrated in FIG. 1).

Ranging mode values are shown in TABLE 1. Other details of the ARC IE can be found in the IEEE standard specification.

TABLE 1

| Ranging mode value | |
|---|---|
| Ranging Mode value | Ranging frame type and the ranging method |
| 0 | Non-secure OWR |
| 1 | non-secure SS-TWR |
| 2 | non-secure DS-TWR |
| 4 | secure OWR with payload |

TABLE 1-continued

Ranging mode value

| Ranging Mode value | Ranging frame type and the ranging method |
|---|---|
| 5 | secure SS-TWR with payload |
| 6 | secure DS-TWR with payload |
| 7 | secure OWR without payload |
| 8 | secure SS-TWR without payload |
| 9 | secure DS-TWR without payload |

Alternative structure of the advanced ranging control IE in 802.15.4z based on revisions is as shown in FIG. 10.

FIG. 10 illustrates an example advanced ranging control IE content field format as defined in 802.15.4z 1000 according to embodiments of the present disclosure. The embodiment of the advanced ranging control IE content field format as defined in 802.15.4z 1000 illustrated in FIG. 10 is for illustration only. FIG. 10 does not limit the scope of the present disclosure to any particular implementation. In one embodiment, the advanced ranging control IE content field format as defined in 802.15.4z 1000 may be used by a controller, a controlee, an initiator, and/or responder as illustrated in FIG. 8. In one embodiment, the advanced ranging control IE content field format as defined in 802.15.4z 1000 may be used by a network entity (e.g., BS 101-103 as illustrated in FIG. 1, terminal 111-116 as illustrated in FIG. 1).

Figure 11:
FIG. 11 illustrates an example ranging scheduling IE according to embodiments of the present disclosure.

For the scheduling-based ranging with multiple devices, the ranging scheduling (RS) IE can be used to convey the resource assignment, which includes the field of RS table and RS table length as illustrated in FIG. 11. The field of RS table length indicates the number of rows in the RS table.

FIG. 11 illustrates an example ranging scheduling IE 1100 according to embodiments of the present disclosure. The embodiment of the ranging scheduling IE 1100 illustrated in FIG. 11 is for illustration only. FIG. 11 does not limit the scope of the present disclosure to any particular implementation. In one embodiment, the ranging scheduling IE 1100 may be used by a controller, a controlee, an initiator, and/or responder as illustrated in FIG. 8. In one embodiment, the ranging scheduling IE 1100 may be used by a network entity (e.g., BS 101-103 as illustrated in FIG. 1, terminal 111-116 as illustrated in FIG. 1).

Figure 12:
FIG. 12 illustrates an example row of ranging scheduling table according to embodiments of the present disclosure.

FIG. 12 illustrates an example row of ranging scheduling table 1200 according to embodiments of the present disclosure. The embodiment of the row of ranging scheduling table 1200 illustrated in FIG. 12 is for illustration only. FIG. 12 does not limit the scope of the present disclosure to any particular implementation. In one embodiment, the row of ranging scheduling table 1200 may be used by a controller, a controlee, an initiator, and/or responder as illustrated in FIG. 8. In one embodiment, the row of ranging scheduling table 1200 may be used by a network entity (e.g., BS 101-103 as illustrated in FIG. 1, terminal 111-116 as illustrated in FIG. 1).

Each row of The RS table includes a slot index field for a time slot, an address field of the device assigned to this slot, and a device type field to indicate the role of the assigned device as illustrated in FIG. 12. Depending on device capability and vendor specification, different types of address can be used. If a device type for a specific address is 0, the device is a responder. Otherwise, the device is an initiator.

A ranging method field of ARC IE may be used to indicate that the current ranging round is used for ranging ancillary information exchange as shown in TABLE 2.

TABLE 2

Ranging method field value

| Ranging method field value | Selected ranging method |
|---|---|
| 00 | One way ranging |
| 01 | Single-sided two way ranging |
| 10 | Double-sided two way ranging |
| 11 | Ranging ancillary information exchange |

In one embodiment, ranging round multiple message acknowledgement is provided.

A ranging round includes several message exchanges between controllers, controlees, initiators and responders. These messages may contain be ranging related frames (RFRAMES) or may carry data such as but not limited to ranging ancillary data or both while other possible exchanges are not precluded. The recipient of these messages may be required to acknowledge the messages received. Multiple message acknowledgement (MMACK) is described in detail for acknowledging multiple messages within a ranging round with single acknowledgement message from the recipient. Note that acknowledging multiple messages with a single acknowledgement message from a receiver or recipient includes but is not limited to the illustrative examples described in this disclosure.

Figure 13:
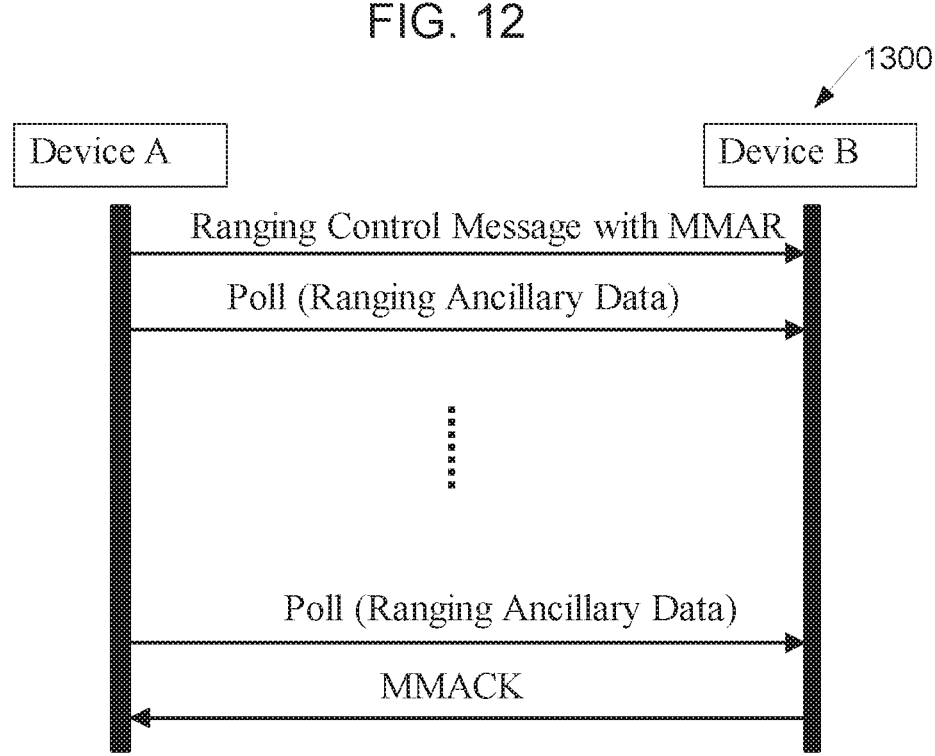
FIG. 13 illustrates an example message sequence chart for one-to-one multiple message acknowledgement (MMACK) according to embodiments of the present disclosure.

FIG. 13 illustrates an example message sequence chart for one-to-one multiple message acknowledgement (MMACK) 1300 according to embodiments of the present disclosure. The embodiment of the message sequence chart for one-to-one multiple message acknowledgement (MMACK) 1300 illustrated in FIG. 13 is for illustration only. FIG. 13 does not limit the scope of the present disclosure to any particular implementation. In one embodiment, the message sequence chart for one-to-one multiple message acknowledgement (MMACK) 1300 may be performed by a network entity (e.g., BS 101-103 as illustrated in FIG. 1, terminal 111-116 as illustrated in FIG. 1). In one embodiment, the message sequence chart for one-to-one multiple message acknowledgement (MMACK) 1300 may be performed by a controller, a controlee, an initiator, and/or responder as illustrated in FIG. 8.

FIG. 13 illustrates a message sequence chart for MMACK in a one-to-one messaging sequence. Device A sends multiple messages along with MMACK Request (MMAR) to a Device B. Device B then sends back a MMACK upon receiving all the messages. The messages and the MMACKS slots may be scheduled or may be contention based or may be a combination of both.

Figure 14:
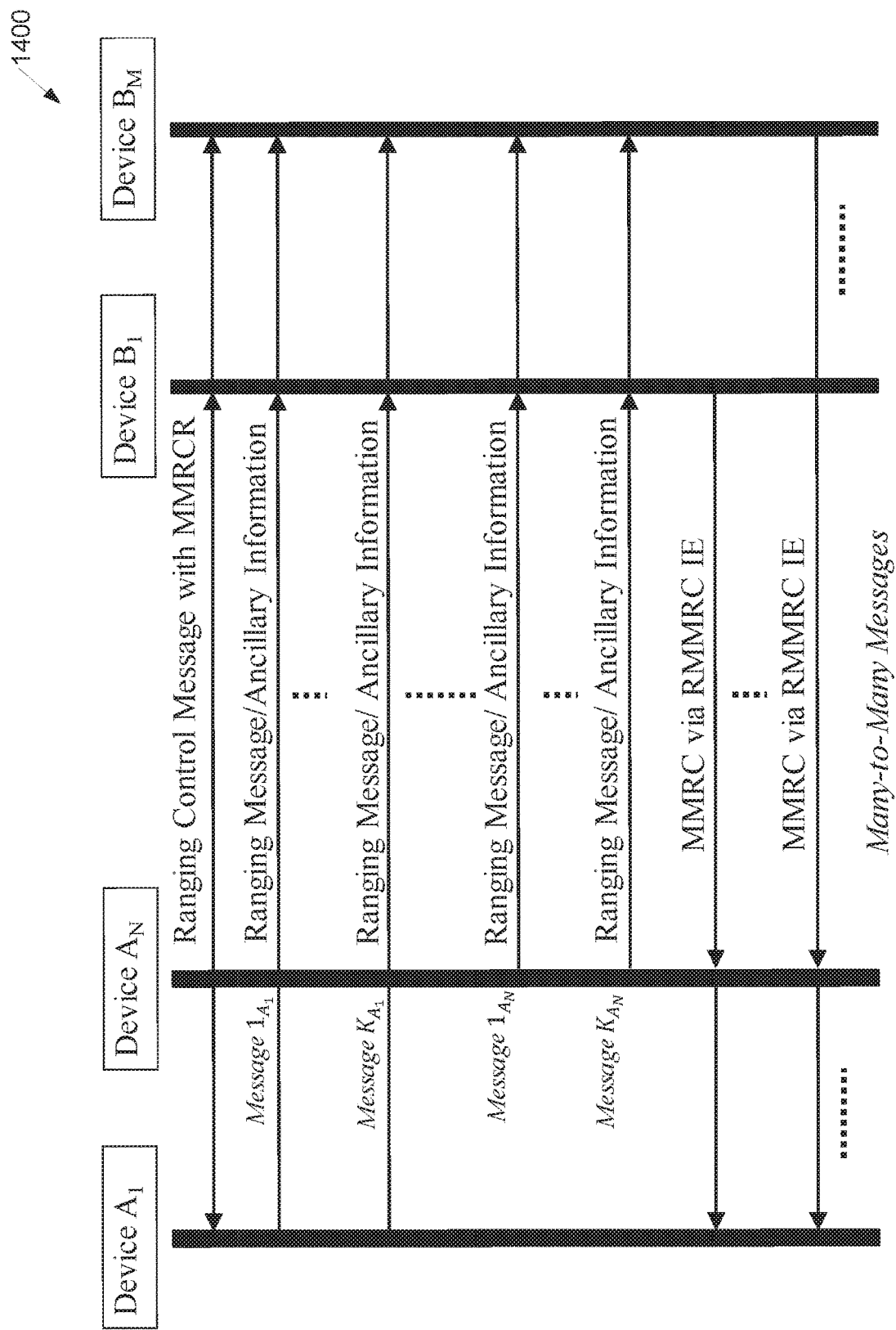
FIG. 14 illustrates an example message sequence chart for multicast or multi-node message acknowledgement (MMACK) according to embodiments of the present disclosure.

FIG. 14 illustrates an example message sequence chart for multicast or multi-node message acknowledgement (MMACK) 1400 according to embodiments of the present disclosure. The embodiment of the message sequence chart for multicast or multi-node message acknowledgement (MMACK) 1400 illustrated in FIG. 14 is for illustration only. FIG. 14 does not limit the scope of the present disclosure to any particular implementation. In one embodiment, the message sequence chart for multicast or multi-node message acknowledgement (MMACK) 1400 may be performed by a network entity (e.g., BS 101-103 as illustrated in FIG. 1, terminal 111-116 as illustrated in FIG. 1). In one embodiment, the message sequence chart for multicast or multi-node message acknowledgement (MMACK) 1400 may be performed by a controller, a controlee, an initiator, and/or responder as illustrated in FIG. 8.

FIG. 14 illustrates a message sequence chart for MMACK where devices A1 to AN send a multicast or multi-node message to devices Bl to BM along with MMAR. Upon the completion of onward messages from (devices Al to AN), devices Bl to BM acknowledge all the messages to different initiators through by sending MMACK via multicast or multi-node messages. The messages and the MMACKS slots may be scheduled or may be contention based or may be a combination of both.

Note that this disclosure does not preclude any number or combination of devices either on the initiator side or on the responder side. Also, the transmission type includes but is not limited to one-to-one, one-to-many, many-to-one, many-to-many, unicast, multicast, multi-node, broadcast and any combinations.

Multiple message acknowledgement may also be termed as multiple message receipt conformation message (MMRCM). The Multiple message acknowledgement request may also be termed as multiple message receipt confirmation request (MMRCR).

Figure 15:
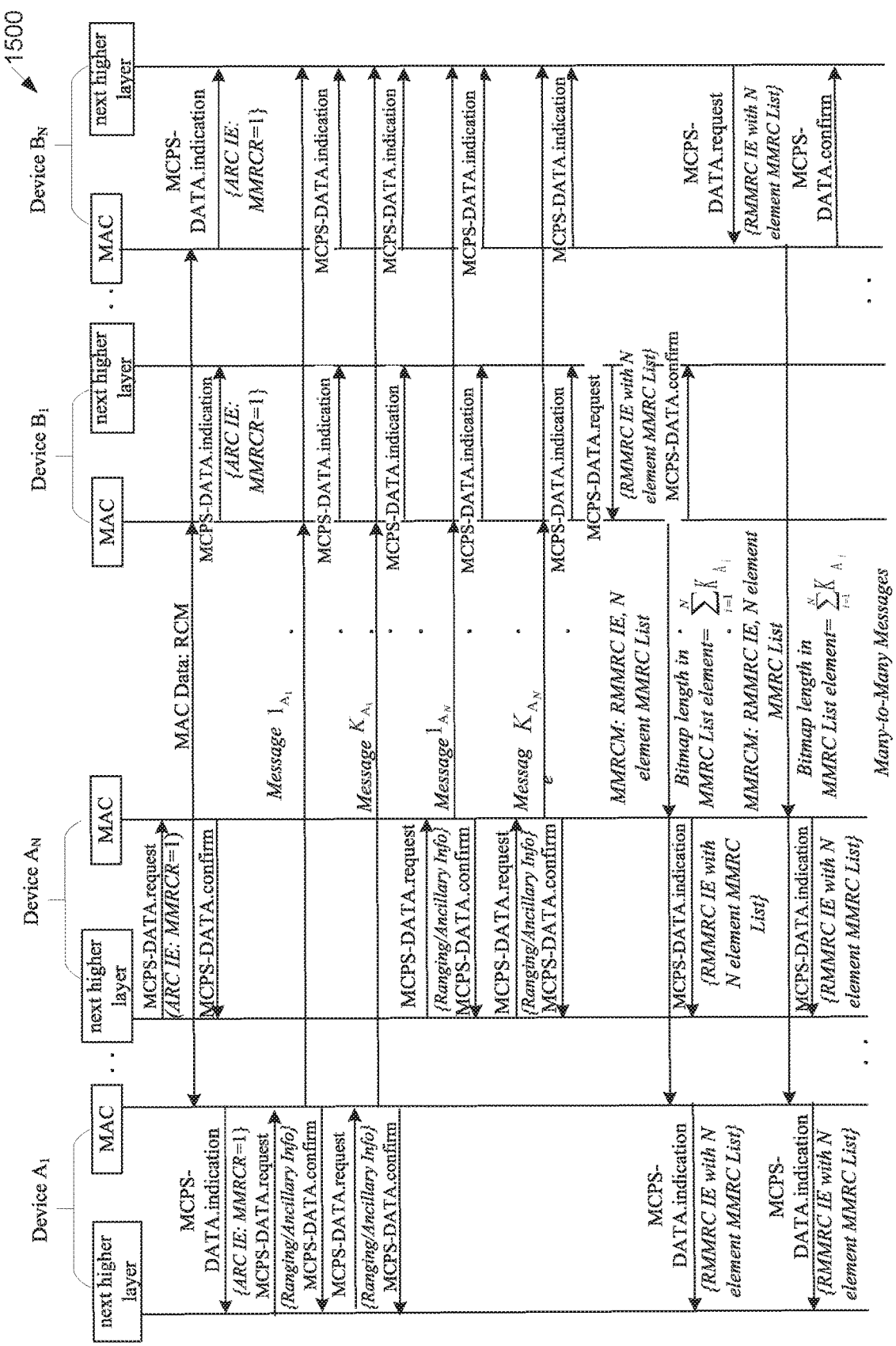
FIG. 15 illustrates an example message sequence chart multiple message receipt confirmation for multiple many-to-many messages according to embodiments of the present disclosure.

FIG. 15 illustrates an example message sequence chart multiple message receipt confirmation for multiple many-to-many messages 1500 according to embodiments of the present disclosure. The embodiment of the message sequence chart multiple message receipt confirmation for multiple many-to-many messages 1500 illustrated in FIG. 15 is for illustration only. FIG. 15 does not limit the scope of the present disclosure to any particular implementation. In one embodiment, the message sequence chart multiple message receipt confirmation for multiple many-to-many messages 1500 may be performed by a network entity (e.g., BS 101-103 as illustrated in FIG. 1, terminal 111-116 as illustrated in FIG. 1). In one embodiment, the message sequence chart multiple message receipt confirmation for multiple many-to-many messages 1500 may be performed by a controller, a controlee, an initiator, and/or responder as illustrated in FIG. 8.

FIG. 15 illustrates a message sequence chart multiple message receipt confirmation for multiple many-to-many messages In one embodiment, methods for multiple message acknowledgement request (MMAR) is provided.

In one example of scheme 1 (S1), multiple message acknowledgement request indicator bit in an IE is provided.

A one-bit field in an existing information element of the 802.15.4z or any such similar standard, such the advanced ranging control IE (does not preclude other IEs) may be used as an indicator to indicate multiple message acknowledgement request (MMAR). This may also be termed as multiple message receipt confirmation request (MMRCR).

FIG. 16A illustrates an example multiple message acknowledgement request bit 1600 in ARC IE to indicate MMAR according to embodiments of the present disclosure. The embodiment of the multiple message acknowledgement request bit 1600 illustrated in FIG. 16A is for illustration only. FIG. 16A does not limit the scope of the present disclosure to any particular implementation. In one embodiment, the multiple message acknowledgement request bit 1600 may be used by a controller, a controlee, an initiator, and/or responder as illustrated in FIG. 8. In one embodiment, the multiple message acknowledgement request bit 1600 may be used by a network entity (e.g., BS 101-103 as illustrated in FIG. 1, terminal 111-116 as illustrated in FIG. 1).

FIG. 16B illustrates another example multiple message acknowledgement request bit 1650 in ARC IE to indicate MMAR according to embodiments of the present disclosure. The embodiment of the multiple message acknowledgement request bit 1650 illustrated in FIG. 16B is for illustration only. FIG. 16B does not limit the scope of the present disclosure to any particular implementation. In one embodiment, the multiple message acknowledgement request bit 1650 may be used by a controller, a controlee, an initiator, and/or responder as illustrated in FIG. 8. In one embodiment, the multiple message acknowledgement request bit 1650 may be used by a network entity (e.g., BS 101-103 as illustrated in FIG. 1, terminal 111-116 as illustrated in FIG. 1).

An illustration of fields of the ARC IE to support this is shown in FIG. 16A and FIG. 16B for two different ARC IE formats. Other formats of an ARC IE or other IEs for conveying this are not precluded. To indicate MMAR, the multiple message acknowledgement request bit is set to 1, else the bit is set to 0. The flowchart to ascertain the indication of MMAR is shown in FIG. 17A and FIG. 17B.

Figures 17A, 17B:
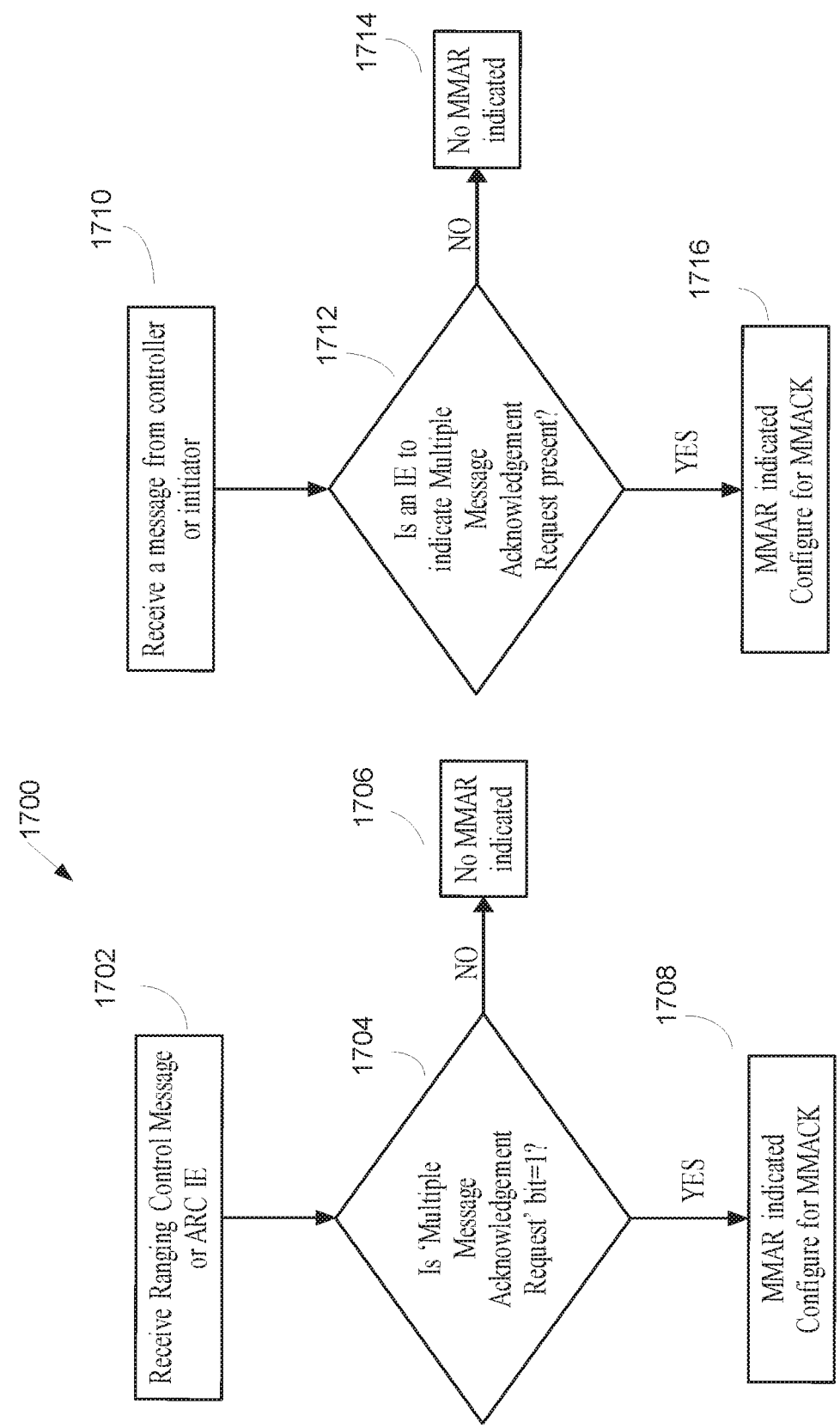
FIG. 17A illustrates an example flowchart to indicate multiple message acknowledgement IE using the MMAR or MMRCR bit in ARC IE according to embodiments of the present disclosure.
FIG. 17B illustrates another example flowchart to indicate multiple message acknowledgement IE using the MMAR or MMRCR bit in ARC IE according to embodiments of the present disclosure.

FIG. 17A illustrates an example flowchart to indicate multiple message acknowledgement IE 1700 using the MMAR or MMRCR bit in ARC IE according to embodiments of the present disclosure. The embodiment of the flowchart to indicate multiple message acknowledgement IE 1700 illustrated in FIG. 17A is for illustration only. FIG. 17A does not limit the scope of the present disclosure to any particular implementation. In one embodiment, the flowchart to indicate multiple message acknowledgement IE 1700 may be performed by a network entity (e.g., BS 101-103 as illustrated in FIG. 1, terminal 111-116 as illustrated in FIG. 1). In one embodiment, the flowchart to indicate multiple message acknowledgement IE 1700 may be performed by a controller, a controlee, an initiator, and/or responder as illustrated in FIG. 8.

As illustrated in FIG. 17A, a network entity receives a ranging control message or ARC in step 1702. In step 1704, the network entity determines whether a multiple message acknowledgement request bit is set to "1." In step 1704, if the bit is not set to "1," the network entity identifies that no MMAR is indicated in step 1706. In step 1704, if the bit is set to "1," the network entity identifies that MMAR is indicated and configure for MMACK in step 1708.

FIG. 17B illustrates another example flowchart to indicate multiple message acknowledgement IE 1750 using the MMAR or MMRCR bit in ARC IE according to embodiments of the present disclosure. The embodiment of the flowchart to indicate multiple message acknowledgement IE 1750 illustrated in FIG. 17B is for illustration only. FIG. 17B does not limit the scope of the present disclosure to any particular implementation. In one embodiment, the flowchart to indicate multiple message acknowledgement IE 1750 may be performed by a network entity (e.g., BS 101-103 as illustrated in FIG. 1, terminal 111-116 as illustrated in FIG. 1). In one embodiment, the flowchart to indicate multiple message acknowledgement IE 1750 may be performed by a controller, a controlee, an initiator, and/or responder as illustrated in FIG. 8.

As illustrated in FIG. 17B, a network entity receives a ranging control message or ARC in step 1710. In step 1712, the network entity determines whether a multiple message receipt confirmation request (MMRCR) bit is set to "1." In step 1712, if the bit is not set to "1," the network entity identifies that no MMAR is requested in step 1714. In step 1712, if the bit is set to "1," the network entity identifies that MMRC is requested and configure for MMRCM in step 1716.

In one example of scheme 2, multiple message acknowledgement request indicator using one-bit field in advanced ranging control IE is provided.

An existing one-bit field such as (including but not limited to) a "deferred mode" can be used (and/or reused) to indicate multiple message acknowledgement request (MMAR) when the "deferred mode" bit is not being used. For example, when ranging round is used for ranging ancillary information exchange, the deferred mode may be reused for MMAR. This illustration does not preclude using or reusing any one-bit field or subfields in the ARC IE or other IEs. Illustrative frame format is as shown in FIG. 18.

Figure 18:
FIG. 18 illustrates an example format for MMAR indicator using one-bit field of ARC IE content field according to embodiments of the present disclosure.

FIG. 18 illustrates an example format for MMAR indicator using one-bit field of ARC IE content field 1800 according to embodiments of the present disclosure. The embodiment of the format for MMAR indicator using one-bit field of ARC IE content field 1800 illustrated in FIG. 18 is for illustration only. FIG. 18 does not limit the scope of the present disclosure to any particular implementation. In one embodiment, the format for MMAR indicator using one-bit field of ARC IE content field 1800 may be used by a controller, a controlee, an initiator, and/or responder as illustrated in FIG. 8. In one embodiment, format for MMAR indicator using one-bit field of ARC IE content field 1800 may be used by a network entity (e.g., BS 101-103 as illustrated in FIG. 1, terminal 111-116 as illustrated in FIG. 1).

Figure 19B:
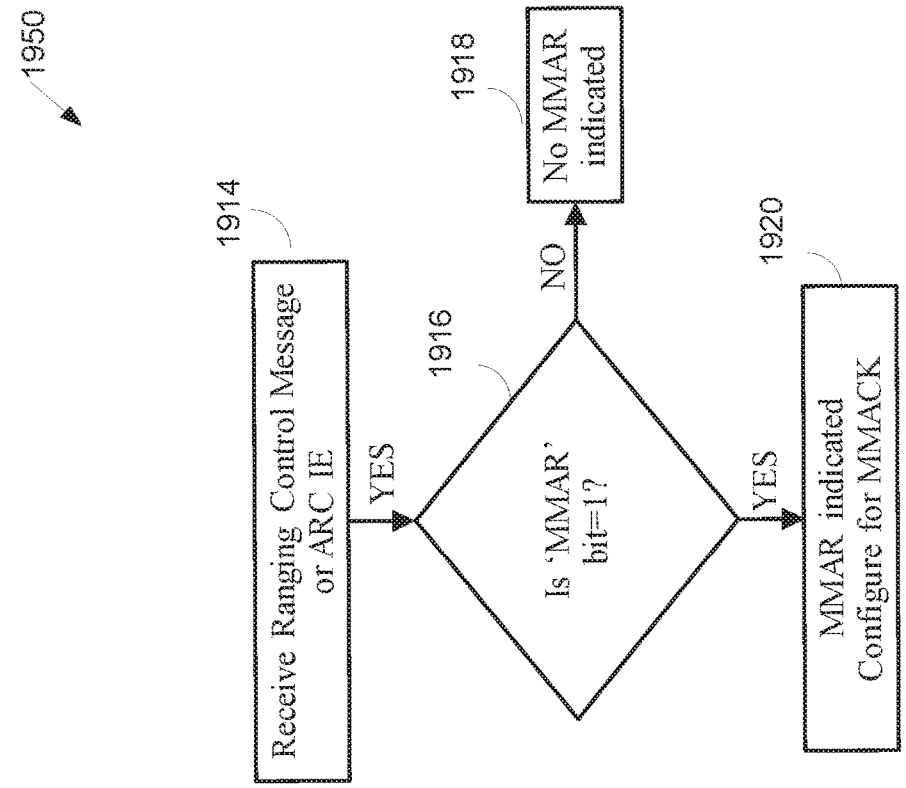
FIG. 19B illustrates another example flowchart of using and/or reusing one-bit field to indicate MMAR in ARC IE according to embodiments of the present disclosure.
Figure 19A:
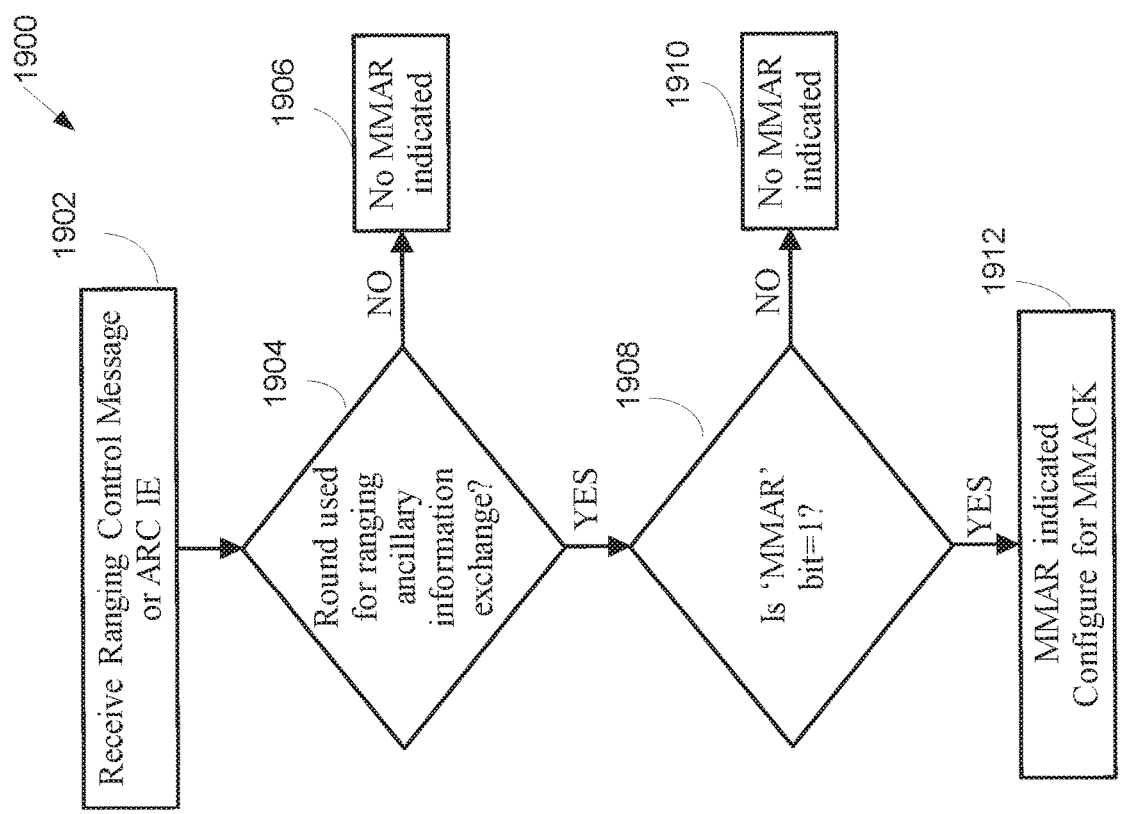
FIG. 19A illustrates an example flowchart of using and/or reusing one-bit field to indicate MMAR in ARC IE according to embodiments of the present disclosure.

FIG. 19A illustrates an example flowchart of using and/or reusing one-bit field to indicate MMAR in ARC IE 1900 according to embodiments of the present disclosure. The embodiment of the flowchart of using and/or reusing one-bit field to indicate MMAR in ARC IE 1900 illustrated in FIG. 19A is for illustration only. FIG. 19A does not limit the scope of the present disclosure to any particular implementation. In one embodiment, flowchart of using and/or reusing one-bit field to indicate MMAR in ARC IE 1900 may be performed by a network entity (e.g., BS 101-103 as illustrated in FIG. 1, terminal 111-116 as illustrated in FIG. 1). In one embodiment, the flowchart of using and/or reusing one-bit field to indicate MMAR in ARC IE 1900 may be performed by a controller, a controlee, an initiator, and/or responder as illustrated in FIG. 8.

As illustrated in FIG. 19A, a network entity in step 1902 receives a ranging control message or ARC IE. In step 1904, the network entity determines whether a round used for ranging ancillary information is exchanged. In step 1904, if not exchanged, the network entity identifies that no MMAR is indicated in step 1906. In step 1904, if exchanged, the network entity determines whether MMAR bit is set to "1" in step 1908. In step 1908, if set to "1," the network entity identifies that MMAR is indicated and configures for MMACK in step 1912. In step 1908, if not set to "1," the network entity identifies that no MMAR is indicated in step 1910.

FIG. 19B illustrates another example flowchart of using and/or reusing one-bit field to indicate MMAR in ARC IE 1950 according to embodiments of the present disclosure. The embodiment of the flowchart of using and/or reusing one-bit field to indicate MMAR in ARC IE 1950 illustrated in FIG. 19B is for illustration only. FIG. 19B does not limit the scope of the present disclosure to any particular implementation. In one embodiment, the flowchart of using and/or reusing one-bit field to indicate MMAR in ARC IE 1950 may be performed by a network entity (e.g., BS 101-103 as illustrated in FIG. 1, terminal 111-116 as illustrated in FIG. 1). In one embodiment, the flowchart of using and/or reusing one-bit field to indicate MMAR in ARC IE 1950 may be performed by a controller, a controlee, an initiator, and/or responder as illustrated in FIG. 8.

As illustrated in FIG. 19B, a network entity in step 1902 receives a ranging control message or ARC IE. In step 1916, the network entity determines whether an MMAR bit is set to "1" in step 1916. In step 1916, if set to "1," the network entity identifies that MMAR is indicated and configures for MMACK in step 1920. In step 1916, if not set to "1," the network entity identifies that no MMAR is indicated in step 1918.

In one example of scheme 3, multiple message acknowledgement request using a new IE is provided.

Figure 20:
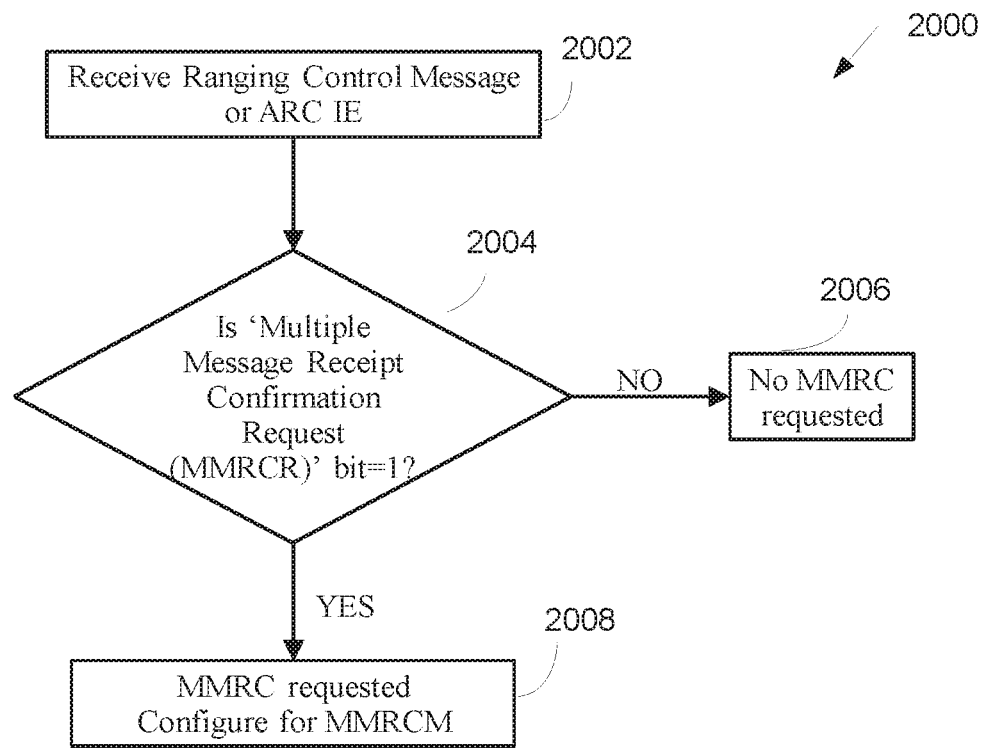
FIG. 20 illustrates an example flowchart to indicate multiple message acknowledgement using an IE according to embodiments of the present disclosure.

To indicate the multiple message acknowledgement request, a new header or payload IE may be defined. This IE may be referred using a name such as but not limited to multiple message acknowledgement request IE (MMAR IE). Upon the reception of this IE, the MMAR indication can be ascertained. This IE may not contain any content field, as the presence of the IE itself acts as an indicator. However, IEs formatted with content field (such as including but not limited to those described in scheme 4) to convey this information is not precluded in this disclosure. The illustrative flowchart to determine the MMAR indication is shown in FIG. 20. The IE itself may be sent via a message such as but not limited to ranging control message, etc.

FIG. 20 illustrates an example flowchart to indicate multiple message acknowledgement 2000 using an IE according to embodiments of the present disclosure. The embodiment of the flowchart to indicate multiple message acknowledgement 2000 illustrated in FIG. 20 is for illustration only. FIG. 20 does not limit the scope of the present disclosure to any particular implementation. a network entity (e.g., BS 101-103 as illustrated in FIG. 1, terminal 111-116 as illustrated in FIG. 1). In one embodiment, the flowchart to indicate multiple message acknowledgement 2000 may be performed by a network entity (e.g., BS 101-103 as illustrated in FIG. 1, terminal 111-116 as illustrated in FIG. 1). In one embodiment, the flowchart to indicate multiple message acknowledgement 2000 may be performed by a controller, a controlee, an initiator, and/or responder as illustrated in FIG. 8.

As illustrated in FIG. 20, a network entity in step 2002 receives a message from controller or initiator. In step 2004, the network entity determines whether an IE to indicate multiple message acknowledgement request is present. In step 2004, if present, the network entity identifies that MMAR is indicated and configure for MMACK. In step 2004, if not present, the network entity identifies that no MMAR is indicated in step 2006.

In one embodiment, methods to acknowledge multiple messages in ranging rounds are provided.

A multiple message acknowledgement IE (MMACK IE) may be used by the responder (or recipient of multiple messages) to acknowledge the multiple messages. Other names for this IE are not precluded. These multiple messages may be from a single initiator or multiple initiators. In case the multiple messages acknowledged originate from multiple initiators (many-to-one data transfer or many-to-many data transfer), the mode of communicating this message containing the MMACK is accordingly chosen (including but not limited unicast, multi-cast, multi-node, etc.). A receiver or responder may use a multiple message acknowledgement to acknowledge multiple messages originating from the same initiator or to acknowledge multiple messages originating from multiple initiators (or transmitters).

Each message is acknowledged in the multiple message acknowledgement through a binary bitmap string. Each bit in the bitmap string may respectively map to a slot or a message or any other message/frame/information identifier.

The length of this acknowledgement bitmap is equal to the number of messages sent by the initiator (or transmitter) or the total number of messages sent by all initiators (or transmitters) to all the responders (or receivers). Each bit acknowledges the receipt of a message. The bit is set to 1 to convey successful reception, else it is set to 0 to convey that the message was not received (or vice versa).

Schemes that include encoding or compressing to convey this acknowledgement bitmap are not precluded. The acknowledgement bits for the first message may correspond to the least significant bit if the MMACK bitmap string and sequentially the following bits may represent the acknowledgement for subsequent messages with the MSB representing the acknowledgement for the final message. A vice versa scheme may also be used or any other scheme to map the bit location in the bitmap string to correspond to a particular message may be used. This disclosure does not preclude any such method.

Several methods are described in this disclosure for the responder to determine the number of bitmaps. However, the methods through which the responder determines this is not limited to the methods in this disclosure. The length of the bitmap may be sent by the controller and/or initiator via higher layer through out-of-band signaling.

In one example of scheme 4, methods to determine the length of multiple message acknowledgement bitmap via ranging scheduling IE are provided.

The controller transmits the ranging scheduling IE informing the schedule of the slots. The schedule allots slots for all initiators that initiate the transmission of messages. The total number of such slots give the total number of messages transmitted in this round by one or more initiators. The responder may determine the length of bitmap from the scheduling information contained in the ranging scheduling IE. An illustrative flow diagram is shown in FIG. 21.

Figure 21:
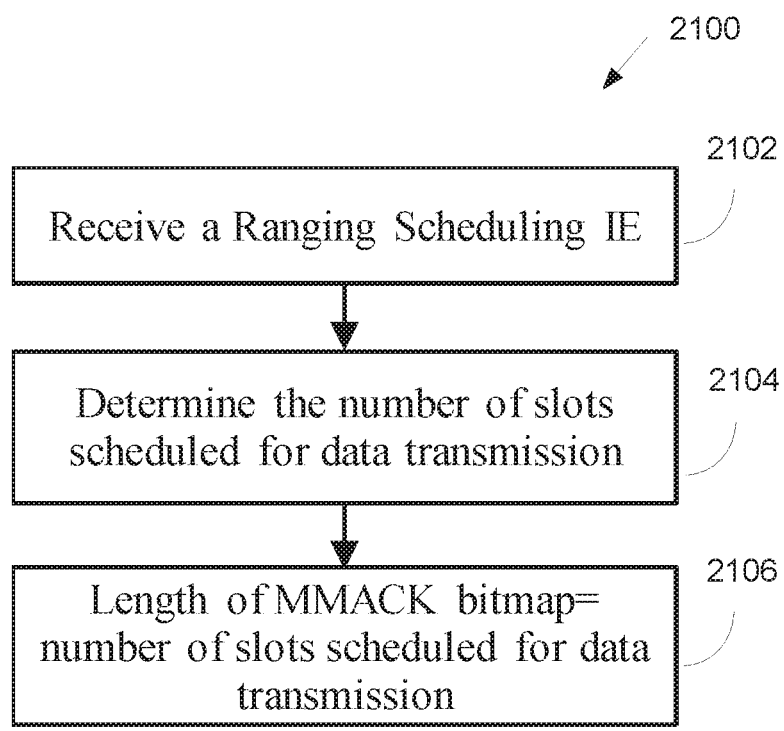
FIG. 21 illustrates an example flow diagram to determine the length of multiple message acknowledgement bitmap via ranging scheduling IE according to embodiments of the present disclosure.

FIG. 21 illustrates an example flowchart to determine the length of multiple message acknowledgement bitmap 2100 via ranging scheduling IE according to embodiments of the present disclosure. The embodiment of the flowchart to determine the length of multiple message acknowledgement bitmap 2100 illustrated in FIG. 21 is for illustration only. FIG. 21 does not limit the scope of the present disclosure to any particular implementation. In one embodiment, the flowchart to determine the length of multiple message acknowledgement bitmap 2100 may be performed by a network entity (e.g., BS 101-103 as illustrated in FIG. 1, terminal 111-116 as illustrated in FIG. 1). In one embodiment, the flowchart to determine the length of multiple message acknowledgement bitmap 2100 may be performed by a controller, a controlee, an initiator, and/or responder as illustrated in FIG. 8.

As illustrated in FIG. 21, a network entity receives a ranging scheduling IE in step 2102. In step 2104, the network entity determines the number of slots scheduled for data transmission. In step 2106, the network entity identifies a length of MMACK bitmap that is a number of slots scheduled for data transmission. In one example of scheme S5, conveying the length of multiple message acknowledgement bitmap via IE is provided.

A multiple message acknowledgement request IE (MMAR IE) may convey the length of the MMACK bitmap in a content field. This may be the same IE described in scheme 2 with a content field or may be a different IE. The content field of the IE may be formatted as illustrated in FIG. 22.

FIG. 22 illustrates an example content field of the IE to convey the length of MMACK bitmap 2200 according to embodiments of the present disclosure. The embodiment of the content field of the IE to convey the length of MMACK bitmap 2200 illustrated in FIG. 22 is for illustration only. FIG. 22 does not limit the scope of the present disclosure to any particular implementation. In one embodiment, the content field of the IE to convey the length of MMACK bitmap 2200 may be used by a controller, a controlee, an initiator, and/or responder as illustrated in FIG. 8. In one embodiment, the content field of the IE to convey the length of MMACK bitmap 2200 may be used by a network entity (e.g., BS 101-103 as illustrated in FIG. 1, terminal 111-116 as illustrated in FIG. 1).

In one example of scheme 6, multiple message acknowledgement using IE with no content field is provided. The MMACK may be conveyed using an IE without any content field. Since the IE is used along with a MAC frame that may have the ability to carry data, the MMACK bitmap carrying information may be included in the data field of the MAC payload of the frame in which this IE is used.

In one example of scheme 7, multiple message acknowledgement using multiple message acknowledgement IE with content field is provide.

The MMACK may be conveyed via an IE with the content field containing the MMACK bitmap information. The bitmap conveys the receipt or non-receipt of the particular message. The content field of the IE may be formatted as illustrated in FIG. 23.

FIG. 23 illustrates an example content field for an IE for multiple message acknowledgement 2300 according to embodiments of the present disclosure. The embodiment of the content field for an IE for multiple message acknowledgement 2300 illustrated in FIG. 23 is for illustration only. FIG. 23 does not limit the scope of the present disclosure to any particular implementation. In one embodiment, the content field for an IE for multiple message acknowledgement 2300 may be used by a controller, a controlee, an initiator, and/or responder as illustrated in FIG. 8. In one embodiment, the content field for an IE for multiple message acknowledgement 2300 may be used by a network entity (e.g., BS 101-103 as illustrated in FIG. 1, terminal 111-116 as illustrated in FIG. 1).

In one example of scheme 8, multiple message acknowledgement with initiator addresses using IE is provided.

Messages from many initiators may be acknowledged with MMACK using an IE with initiator addresses and MMACK bitmap string to acknowledge all the messages from that initiator (or transmitter). The IE can contain a table to acknowledge multiple initiators in a single message. The content field of the IE may be formatted as illustrated in FIG. 24.

FIG. 24 illustrates an example content field of IE for MMACK with addresses in acknowledgement 2400 according to embodiments of the present disclosure. The embodiment of the example content field of IE for MMACK with addresses in acknowledgement 2400 illustrated in FIG. 24 is for illustration only. FIG. 24 does not limit the scope of the present disclosure to any particular implementation. In one embodiment, the content field of IE for MMACK with addresses in acknowledgement 2400 may be used by a controller, a controlee, an initiator, and/or responder as illustrated in FIG. 8. In one embodiment, the content field of IE for MMACK with addresses in acknowledgement 2400 may be used by a network entity (e.g., BS 101-103 as illustrated in FIG. 1, terminal 111-116 as illustrated in FIG. 1).

Figure 25:
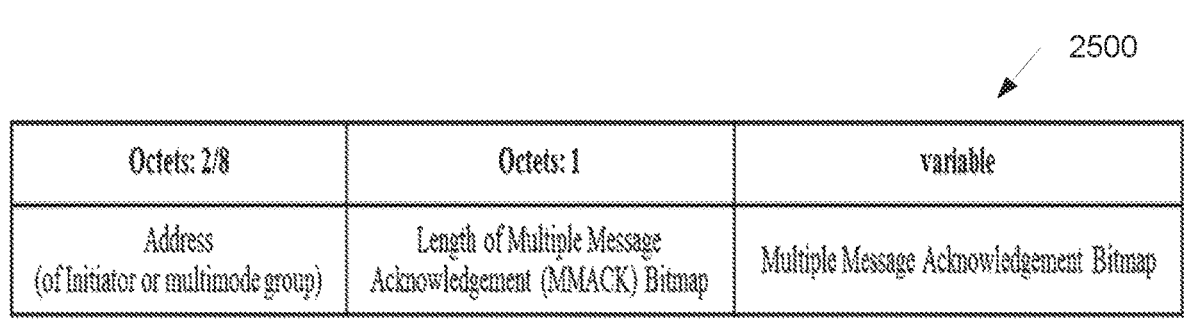
FIG. 25 illustrates an example rows of MMACK table according to embodiments of the present disclosure.

Each row of the MMACK table is formatted as illustrated in FIG. 25.

FIG. 25 illustrates an example rows of MMACK table 2500 according to embodiments of the present disclosure. The embodiment of the rows of MMACK table 2500 illustrated in FIG. 25 is for illustration only. FIG. 25 does not limit the scope of the present disclosure to any particular implementation. In one embodiment, the rows of MMACK table 2500 may be used by a controller, a controlee, an initiator, and/or responder as illustrated in FIG. 8. In one embodiment, the rows of MMACK table 2500 may be used by a network entity (e.g., BS 101-103 as illustrated in FIG. 1, terminal 111-116 as illustrated in FIG. 1).

In one example of scheme 9, multiple message receipt confirmation (MMRC) message with optional initiator addresses using IE is provided.

Messages from many initiators may be acknowledged with MMRCM using an IE with optional initiator addresses and MMRC bitmap string to acknowledge all the messages from that initiator (or transmitter). In a schedule mode where each slot is scheduled for a unique initiator (or transmitter), initiator addresses need not be used. The ranging multiple message receipt confirmation IE (RMMRC IE) contains a table to send receipt confirmation to multiple initiators in a single message. The content field of the IE is formatted as illustrated in FIG. 26.

Figure 26:
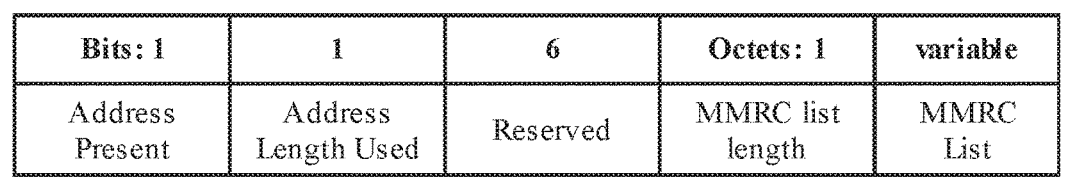
FIG. 26 illustrates an example RMMRC IE content field format according to embodiments of the present disclosure.

FIG. 26 illustrates an example RMMRC IE content field format 2600 according to embodiments of the present disclosure. The embodiment of the RMMRC IE content field format 2600 illustrated in FIG. 26 is for illustration only. FIG. 26 does not limit the scope of the present disclosure to any particular implementation. In one embodiment, the RMMRC IE content field format 2600 may be used by a controller, a controlee, an initiator, and/or responder as illustrated in FIG. 8. In one embodiment, the RMMRC IE content field format 2600 may be used by a network entity (e.g., BS 101-103 as illustrated in FIG. 1, terminal 111-116 as illustrated in FIG. 1).

An address present bit is set to "1" if address of the initiator is present in the MMRC list element, otherwise the address present bit is set to "0."

An address length used bit is set to "0" if 2-octet short address is used in MMRC list, otherwise the address length used bit is set to "1" to indicate 8-octet long address if used in MMRC list. If the address present bit is "0," this field is ignored.

Each row of the MMACK table is formatted as illustrated in FIG. 25.

Figure 27:
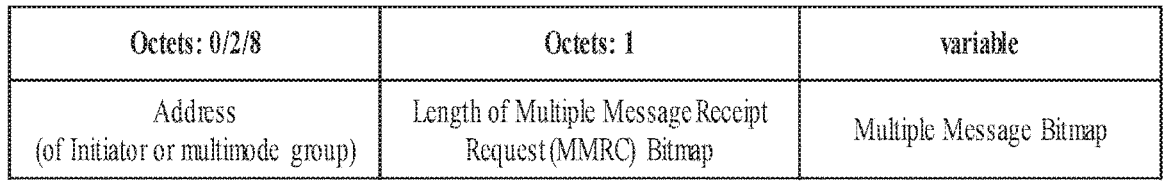
FIG. 27 illustrates an example MMRC list element format according to embodiments of the present disclosure.

FIG. 27 illustrates an example MMRC list element format 2700 according to embodiments of the present disclosure. The embodiment of the MMRC list element format 2700 illustrated in FIG. 27 is for illustration only. FIG. 27 does not limit the scope of the present disclosure to any particular implementation. In one embodiment, the MMRC list element format 2700 may be used by a controller, a controlee, an initiator, and/or responder as illustrated in FIG. 8. In one embodiment, the MMRC list element format 2700 may be used by a network entity (e.g., BS 101-103 as illustrated in FIG. 1, terminal 111-116 as illustrated in FIG. 1).

The address field when present, indicates the address of the initiator for which the MMRC bitmap of the corresponding list element indicates the receipt confirmation. MMRC bitmap length is given by ceiling (NumberOfSlotsbeing acknowledged/8).

The MMRC bitmap field contains a binary bitmap string. Each bit maps to the slots in the ranging round(s) that the RMMRC IE is used to send message receipt confirmations. Each bit confirms the receipt of a message in the slot. The bit is set to 1 to confirm successful reception, otherwise the bit is set to 0 to convey that the message was not received or not addressed to the MMRC sender in that slot. The first bit in time sent in the field refers to the first time slot and the subsequent bits refer chronologically to the subsequent time slots. When the number of bits sent in the MMRC bitmap is greater than the number of slots for which the receipt confirmation is being used, the last bits sent, given by ExtraBits=(NumberOfBitsinMMRCBitmap−NumberOfSlotsForReceiptConfirmation) are discarded.

Figure 28:
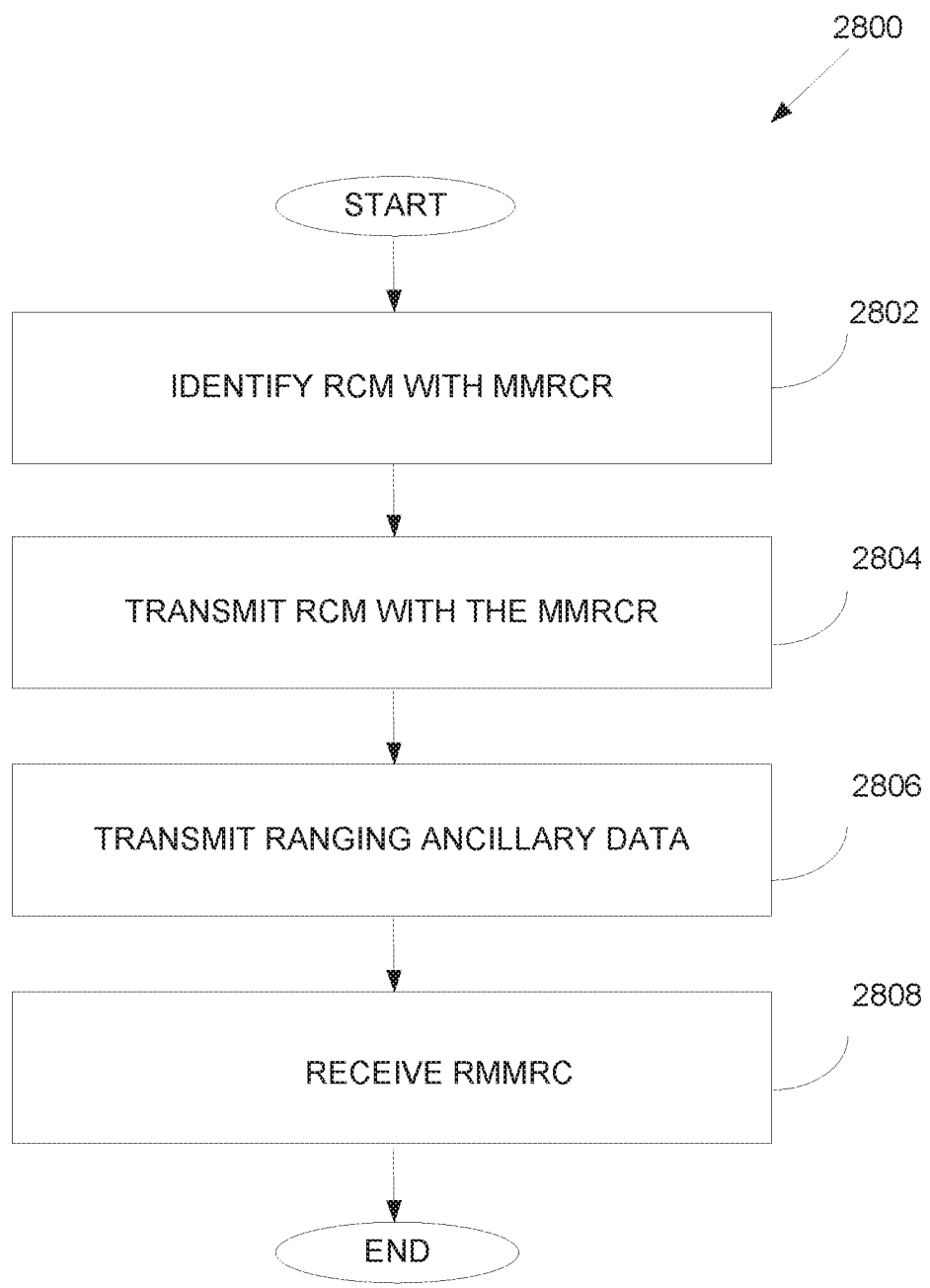
FIG. 28 illustrates an example flowchart of a method for acknowledging multiple messages according to embodiments of the present disclosure.

FIG. 28 illustrates an example flowchart of a method 2800 for acknowledging multiple messages according to embodiments of the present disclosure, as may be performed by a network entity (e.g., BS 101-103 as illustrated in FIG. 1, terminal 111-116 as illustrated in FIG. 1). The embodiment of the flowchart of a method 2800 illustrated in FIG. 28 is for illustration only. FIG. 28 does not limit the scope of the present disclosure to any particular implementation. In one embodiment, the method 2800 may be performed by a controller, a controlee, an initiator, and/or responder as illustrated in FIG. 8.

As illustrated in FIG. 28, the method 2800 begins at step 2802. In step 2802, the network entity identifies, in a ranging block, one or more ranging rounds to transmit a ranging control message (RCM) with a multiple message receipt confirmation request (MMRCR) for a transmission of at least one first message comprising at least one of a set of ranging messages or a set of ranging ancillary data messages.

Subsequently, in step 2804, the network entity transmits, to a second network entity, the RCM with the MMRCR.

Subsequently, the network entity in step 2806 transmits, to the second network entity, ranging ancillary data in at least one ranging round of one or more ranging rounds following the RCM, wherein the ranging ancillary data is associated with the MMRCR.

Finally, in step 2808, the network entity receives, from the second network entity, a ranging multiple message receipt confirmation (RMMRC) corresponding to the transmission of the at least one first message.

In one embodiment, in step 2808, the RMMRC further comprises at least one acknowledgement corresponding to a transmission of at least one second message transmitted from another first network entity to the second network entity; and the at least one second message comprises at least one of another ranging message or another ranging ancillary data message.

In one embodiment, the network entity identifies a reception mode of the RMMRC; and receives the RMMRC based on the identified reception mode, the reception mode being determined as at least one of a contention-based reception mode or a scheduled mode.

In one embodiment, the network entity transmits, to the second network entity, the RCM including an advanced ranging control information element (ARC IE) or the ARC IE using one of messages to be transmitted to the second network entity.

In such embodiment, the ARC IE comprises a multi-node mode field, a ranging round usage field, a scrambled timestamp sequence (STS) packet configuration field, a schedule mode field, a deferred mode field, a time structure indicator field, an RCM validity rounds field, an MMRCR field, a ranging block duration field, a ranging round duration field, and a ranging slot duration field; and the MMRCR field is set to one when the first network entity transmits, to the second network entity, the MMRCR.

In one embodiment, the network entity receives the RMMRC via at least one of a set of multicast messages or a set of multi-mode messages. In such embodiment, the RMMRC comprises an RMMRC IE that includes an MMRC list length field and an MMRC list field; the MMRC list length field indicates a number of elements in the MMRC list field; and the MMRC list field comprises an address field, an MMRC bitmap length field, and an MMRC bitmap field comprising a binary bitmap string; each bit of the binary bitmap string is mapped to each slot of a set of slots in the at least one ranging round where the RMMRC IE is used to send message receipt confirmations corresponding to the transmission of the at least one first message; and each bit of the binary bitmap string is set to one to confirm successful reception of the transmission of the at least one first message, otherwise, each bit of the binary bitmap string is set to zero.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A first device in a wireless communication system supporting ranging capability, the first device comprising:
   a processor configured to generate a ranging control message (RCM) comprising a multiple message receipt confirmation request (MMRCR) information, the MMRCR information indicating that multiple message receipt confirmation is requested; and
   a transceiver operably connected to the processor, the transceiver configured to:
      transmit, to a second device, the generated RCM in a ranging block including a plurality of ranging rounds; and
      receive, from the second device, a multiple message receipt confirmation message (MMRCM) to confirm receipt of multiple messages,
   wherein:
      the MMRCM comprises a ranging multiple message receipt confirmation information element (RMMRC IE) that includes an MMRC list length field and an MMRC list field,
      the MMRC list length field indicates a number of elements in the MMRC list field, and
      the MMRC list field comprises an address field, an MMRC bitmap length field, and an MMRC bitmap field comprising a binary bitmap string.

2. The first device of claim 1, wherein:
   the MMRCM is sent by the second device to confirm the receipt of the multiple messages transmitted from one or more devices including the first device, via multicast or multi-node messages.

3. The first device of claim 1, wherein:
   the transceiver is further configured to receive the MMRCM based on at least one of a contention-based mode or a scheduled mode or a combination of the contention-based mode and the scheduled mode.

4. The first device of claim 1, wherein the transceiver is further configured to transmit, to the second device, the RCM including an advanced ranging control information element (ARC IE).

5. The first device of claim 4, wherein:
   the ARC IE comprises a multi-node mode field, a ranging round usage field, a scrambled timestamp sequence (STS) packet configuration field, a schedule mode field, a deferred mode field, a time structure indicator field, an RCM validity rounds field, an MMRCR field, a ranging block duration field, a ranging round duration field, and a ranging slot duration field; and
   the MMRCR field is set to one when the multiple message receipt confirmation is requested.

6. The first device of claim 1, wherein each bit of the binary bitmap string is mapped to a slot in at least one ranging round of the ranging block to confirm successful reception of a message transmitted in the slot.

7. A second device in a wireless communication system supporting ranging capability, the second device comprising:
   a processor configured to generate a ranging control message (RCM) comprising a multiple message receipt confirmation request (MMRCR) information, the MMRCR information indicating that multiple message receipt confirmation is requested; and
   a transceiver operably connected to the processor, the transceiver configured to:
      receive, from a first device, the generated RCM in a ranging block including a plurality of ranging rounds; and
      transmit, to the first device, a multiple message receipt confirmation message (MMRCM) to confirm receipt of multiple messages,
   wherein:
      the MMRCM comprises a ranging multiple message receipt confirmation information element (RMMRC IE) that includes an MMRC list length field and an MMRC list field,
      the MMRC list length field indicates a number of elements in the MMRC list field, and
      the MMRC list field comprises an address field, an MMRC bitmap length field, and an MMRC bitmap field comprising a binary bitmap string.

8. The second device of claim 7, wherein:
   the MMRCM is sent by the second device to confirm the receipt of the multiple messages transmitted from one or more devices including the first device, via multicast or multi-node messages.

9. The second device of claim 7, wherein:
   the transceiver is further configured to transmit the MMRCM based on at least one of a contention-based mode or a scheduled mode or a combination of the contention-based mode and the scheduled mode.

10. The second device of claim 7, wherein the transceiver is further configured to receive, from the first device, the RCM including an advanced ranging control information element (ARC IE).

11. The second device of claim 10, wherein:
    the ARC IE comprises a multi-node mode field, a ranging round usage field, a scrambled timestamp sequence (STS) packet configuration field, a schedule mode field, a deferred mode field, a time structure indicator field, an RCM validity rounds field, an MMRCR field, a ranging block duration field, a ranging round duration field, and a ranging slot duration field; and the MMRCR field is set to one when the multiple message receipt confirmation is requested.

12. The second device of claim 7, wherein each bit of the binary bitmap string is mapped to a slot in at least one ranging round of the ranging block to confirm successful reception of a message transmitted in the slot.

13. A method of a first device in a wireless communication system supporting ranging capability, the method comprising:
generating a ranging control message (RCM) comprising a multiple message receipt confirmation request (MMRCR) information, the MMRCR information indicating that multiple message receipt confirmation is requested;
transmitting, to a second device, the generated RCM in a ranging block including a plurality of ranging rounds; and
receiving, from the second device, a multiple message receipt confirmation message (MMRCM) to confirm receipt of multiple messages,
wherein:
the MMRCM comprises a ranging multiple message receipt confirmation information element (RMMRC IE) that includes an MMRC list length field and an MMRC list field,
the MMRC list length field indicates a number of elements in the MMRC list field, and
the MMRC list field comprises an address field, an MMRC bitmap length field, and an MMRC bitmap field comprising a binary bitmap string.

14. The method claim 13, wherein:
the MMRCM is sent by the second device to confirm the receipt of the multiple messages transmitted from one or more devices including the first device, via multicast or multi-node messages.

15. The method of claim 13, further comprising:
receiving the MMRCM based on at least one of a contention-based mode or a scheduled mode or a combination of the contention-based mode and the scheduled mode.

16. The method of claim 13, further comprising transmitting, to the second device, the RCM including an advanced ranging control information element (ARC IE).

17. The method of claim 16, wherein:
the ARC IE comprises a multi-node mode field, a ranging round usage field, a scrambled timestamp sequence (STS) packet configuration field, a schedule mode field, a deferred mode field, a time structure indicator field, an RCM validity rounds field, an MMRCR field, a ranging block duration field, a ranging round duration field, and a ranging slot duration field; and
the MMRCR field is set to one when the multiple message receipt confirmation is requested.

18. The method of claim 13, wherein each bit of the binary bitmap string is mapped to a slot in at least one ranging round of the ranging block to confirm successful reception of message transmitted in the slot.

* * * * *